United States Patent
Hwang

(10) Patent No.: US 11,397,607 B2
(45) Date of Patent: Jul. 26, 2022

(54) STORAGE DEVICE AND STORAGE VIRTUALIZATION SYSTEM

(71) Applicant: SAMSUNG ELECTRONICS CO., LTD., Suwon-si (KR)

(72) Inventor: Joo-Young Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 16/810,500

(22) Filed: Mar. 5, 2020

(65) Prior Publication Data

US 2020/0201669 A1    Jun. 25, 2020

Related U.S. Application Data

(63) Continuation of application No. 15/216,312, filed on Jul. 21, 2016, now abandoned.

(30) Foreign Application Priority Data

Jul. 28, 2015   (KR) ........................ 10-2015-0106773

(51) Int. Cl.
*G06F 9/455* (2018.01)
*G06F 12/02* (2006.01)
*G06F 12/109* (2016.01)

(52) U.S. Cl.
CPC ...... *G06F 9/45558* (2013.01); *G06F 12/0246* (2013.01); *G06F 12/109* (2013.01); *G06F 2009/45579* (2013.01); *G06F 2009/45583* (2013.01); *G06F 2212/1016* (2013.01); *G06F 2212/1036* (2013.01); *G06F 2212/151* (2013.01); *G06F 2212/2022* (2013.01); *G06F 2212/651* (2013.01); *G06F 2212/7201* (2013.01)

(58) Field of Classification Search
CPC ....... G06F 9/45558; G06F 2009/45579; G06F 2009/45583; G06F 12/0246; G06F 2212/7201; G06F 2212/1016; G06F 12/109; G06F 2212/1036; G06F 2212/151; G06F 2212/2022; G06F 2212/651
USPC ........................................... 711/103
See application file for complete search history.

(56) References Cited

U.S. PATENT DOCUMENTS

| 7,337,299 B2 | 2/2008 | Sakaki et al. |
| 8,386,749 B2 | 2/2013 | Dannowski et al. |
| 8,443,156 B2 | 5/2013 | Adams et al. |
| 8,473,947 B2 | 6/2013 | Goggin et al. |

(Continued)

FOREIGN PATENT DOCUMENTS

KR    1020150039377    4/2015

OTHER PUBLICATIONS

VMware-VSphere-Storage-API-Array-Integration (VAAI) Technical Marketing Documentation V 1.1/Dec. 2012, pp. 1-19.

(Continued)

*Primary Examiner* — Hashem Farrokh
(74) *Attorney, Agent, or Firm* — Volentine, Whitt & Francos, PLLC

(57) ABSTRACT

The storage device and storage virtualization system include a non-volatile memory device, and a memory controller configured to generate at least one virtual device corresponding to a physical storage area of the non-volatile memory device, and convert a virtual address for the virtual device into a physical address in response to an access request.

20 Claims, 18 Drawing Sheets

(56) References Cited

U.S. PATENT DOCUMENTS

| | | | |
|---|---|---|---|
| 8,627,456 B2 | 1/2014 | McKenzie et al. | |
| 8,650,342 B2 | 2/2014 | Brahmaroutu | |
| 8,707,010 B2 | 4/2014 | Doi | |
| 8,799,621 B2 | 8/2014 | Grisenthwaite | |
| 2009/0037682 A1* | 2/2009 | Armstrong | G06F 9/45558 |
| | | | 711/164 |
| 2009/0144731 A1* | 6/2009 | Brown | G06F 13/102 |
| | | | 718/1 |
| 2010/0138592 A1 | 6/2010 | Cheon | |
| 2013/0097377 A1* | 4/2013 | Satoyama | G06F 3/065 |
| | | | 711/114 |
| 2014/0019701 A1* | 1/2014 | Ohira | G06F 3/0616 |
| | | | 711/165 |
| 2014/0201422 A1 | 7/2014 | Tseng et al. | |
| 2014/0223079 A1* | 8/2014 | Zhang | G06F 12/0246 |
| | | | 711/103 |
| 2014/0281040 A1 | 9/2014 | Liu | |
| 2014/0281150 A1 | 9/2014 | Kuo et al. | |
| 2015/0089116 A1 | 3/2015 | Chin et al. | |
| 2015/0242227 A1* | 8/2015 | Nair | G06F 12/0802 |
| | | | 718/1 |
| 2016/0077975 A1* | 3/2016 | Stabrawa | G06F 3/0631 |
| | | | 711/209 |
| 2016/0098367 A1 | 4/2016 | Etsion et al. | |
| 2016/0231929 A1 | 8/2016 | Tsirkin | |

OTHER PUBLICATIONS

PCI-SIG SR-IOV Primer, 321211-002, Revision 2.5, Jan. 2011.
Slack, Eric, "Storage virtualization solutions at the array or in the network," TechTarget.

\* cited by examiner

STORAGE DEVICE AND STORAGE VIRTUALIZATION SYSTEM

CROSS-REFERENCE TO RELATED APPLICATION

This is a Continuation of U.S. application Ser. No. 15/216,312, filed Jul. 21, 2016 which claims the benefit of Korean Patent Application No. 10-2015-0106773, filed on Jul. 28, 2015, in the Korean Intellectual Property Office, the disclosure of which is incorporated herein in its entirety by reference.

BACKGROUND

The inventive concept relates to virtualization systems and control methods thereof, and more particularly, to storage devices and storage virtualization systems.

With developments in processor technology, interest in virtualization technology is increasing. In host virtualization technology, a single physical device is able to independently operate many operating systems (OSs). Furthermore, in storage virtualization technology, a storage device connected to a virtual machine of a host is virtualized. Systems to which virtualization technology is applied provide increased resource usage efficiency but may have degraded input/output (I/O) performance. Accordingly, research into virtualization systems having improved I/O performance is being conducted.

SUMMARY

The inventive concept may provide a storage device for improving software overhead in a virtualization system.

The inventive concept also may provide a storage virtualization system for improving software overhead in a virtualization system.

According to an aspect of the inventive concept, there is provided a storage device including a non-volatile memory device, and a memory controller configured to generate at least one virtual device corresponding to a physical storage area of the non-volatile memory device and convert a virtual address for the virtual device into a physical address in response to an access request.

According to another aspect of the inventive concept, there is provided a storage virtualization system including a host configured to communicate with devices connected through an input/output (I/O) adapter and process data in a virtualization environment, and at least one storage device connected to the I/O adapter, wherein the storage device generates at least one virtual device in response to a device virtualization request received from the host, performs a resource mapping process converting the virtual address into a logical address in response to an access request from the host, and performs an address conversion process converting the converted logical address into a physical address.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
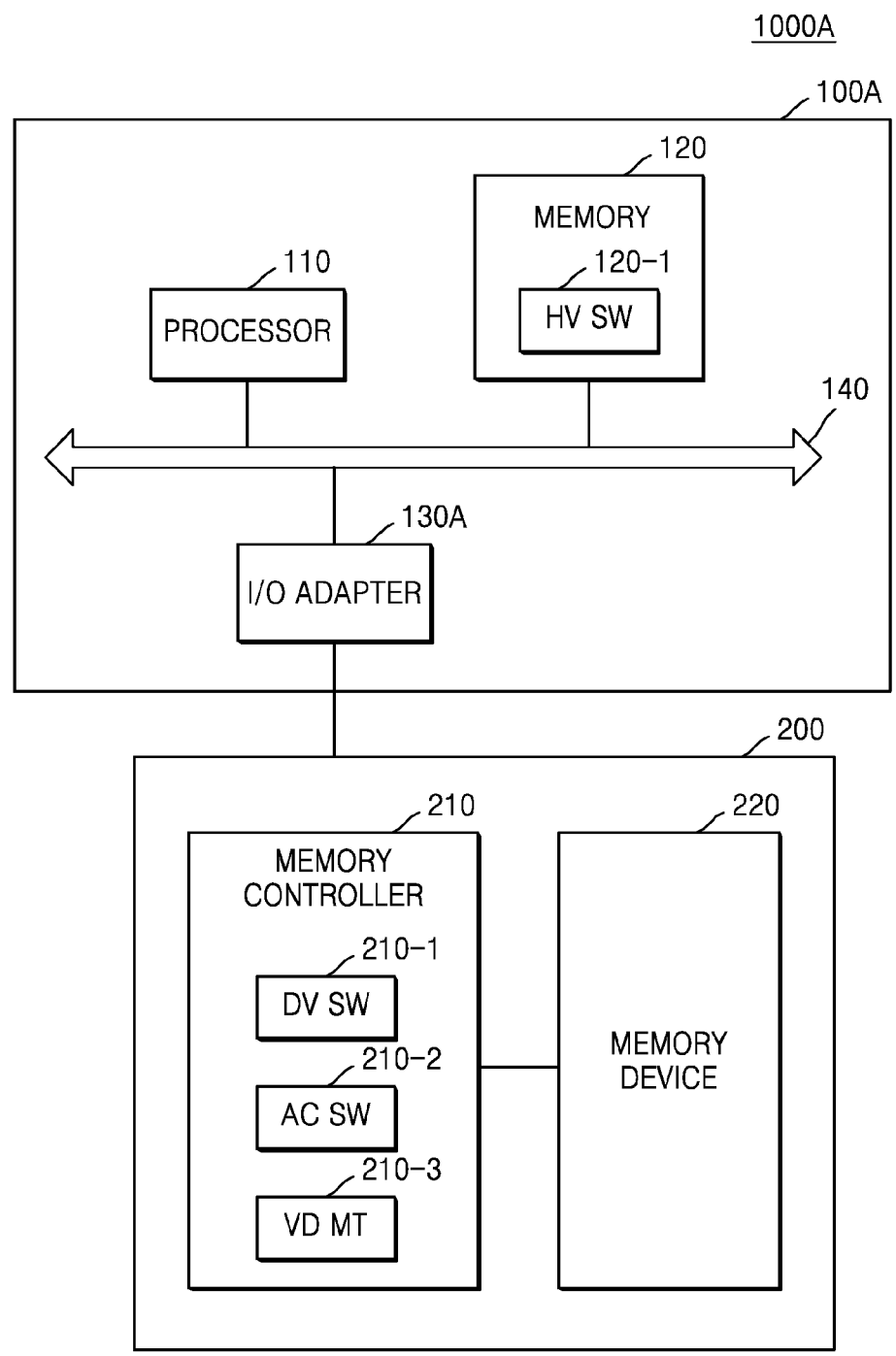
FIG. 1 is a block diagram illustrating a computing system according to an exemplary embodiment of the inventive concept.

Hereinafter, the inventive concept will be described more fully with reference to the accompanying drawings, in which exemplary embodiments of the inventive concept are shown. Rather, these embodiments are provided so that this disclosure will be thorough and complete, and will fully convey the scope of the inventive concept to one of ordinary skill in the art. As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the drawings, like reference numerals denote like elements and the sizes or thicknesses of elements may be exaggerated for clarity of explanation. Expressions such as "at least one of" when preceding a list of elements, modify the entire list of elements and do not modify the individual elements of the list.

The terms used in the present specification are merely used to describe particular embodiments, and are not intended to limit the inventive concept. An expression used in the singular encompasses the expression in the plural, unless it has a clearly different meaning in the context. In the present specification, it is to be understood that the terms such as "including", "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined differently, all terms used in the description including technical and scientific terms have the same meaning as generally understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As is traditional in the field of the inventive concept, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

FIG. 1 is a block diagram illustrating a computing system according to an exemplary embodiment of the inventive concept.

Referring to FIG. 1, the computing system 1000A includes a host 100A and a storage device 200. For example, the computing system 1000A may be a personal computer (PC), a set-top box, a modem, a mobile device, and a server.

The host 100A includes a processor 110, a memory 120, an input/output (I/O) adapter 130A, and a bus 140. Components of the host 100A may exchange signals and data through the bus 140.

The processor 110 may include a circuit, interfaces, or program code for processing data and controlling operations of the components of the computing system 1000A. For example, the processor 110 may include a central processing unit (CPU), an advanced risk machine (ARM), or an application specific integrated circuit (ASIC).

The memory 120 may include a static random access memory (SRAM) or dynamic random access memory (DRAM), which stores data, commands, or program codes which may be needed for operations of the computing system 1000A. Furthermore, the memory 120 may include a non-volatile memory. The memory 120 may store executable program code for operating at least one operating system (OS) and virtual machines (VMs). The memory 120 may also store program code that executes a VM monitor (VMM) for managing the VMs. The VMs and the virtualization program code executing the VMM may be included in host virtualization software (HV SW) 120-1.

The processor 110 may execute at least one operating system and the VMs by executing the HV SW 120-1 stored in the memory 120. Furthermore, the processor 110 may execute the VMM for managing the VMs. The processor 110 may control the components of the computing system 1000A by the above method.

The I/O adapter 130A is an adapter for connecting I/O devices to the host 100A. For example, the I/O adapter 130A may include a peripheral component interconnect (PCI) or PCI express (PCIe) adapter, a small computer system interface (SCSI) adapter, a fiber channel adapter, a serial advanced technology attachment (ATA), or the like. The I/O adapter 130A may include a circuit, interfaces, or code capable of communicating information with devices connected to the computing system 1000A. The I/O adapter 130A may include at least one standardized bus and at least one bus controller. Therefore, the I/O adapter 130A may recognize and assign identifier to devices connected to the bus 140, and may allocate resources to the various devices connected to the bus 140. That is, the I/O adapter 130A may manage communications along the bus 140. For example, the I/O adapter 130A may be a PCI or PCIe system, and the I/O adapter 130A may include a PCIe route complex and at least one PCIe switch or bridge. For example, the I/O adapter 130A may be controlled by the VMM.

PCI defines a bus protocol used for connecting I/O devices to the processor 110. PCIe defines a physical communication layer as a high-speed serial interface with a meaning of programming defined by a PCI standard.

The storage device 200 may be realized as a solid state drive (SSD) or a hard disk drive (HDD). For example, the storage device 200 may be connected to the host 100A by a directly attached storage (DAS) method. Furthermore, the storage device 200 may be connected to the host 100A by a network attached storage (NAS) method or a storage area network (SAN) method.

The storage device 200 includes a memory controller 210 and a memory device 220.

The memory controller 210 may control the memory device 220 based on a command received from the host 100A. The memory controller 210 may control program (or write), read and erasure operations with respect to the memory device 220 by providing address, command and control signals to the memory device 220.

The memory controller 210 may store device virtualization software (DV SW) 210-1, access control software (AC SW) 210-2, and virtual device mapping table information (VD MT) 210-3. The memory controller 210 may generate at least one virtual device by operating the DV SW 210-1. The memory controller 210 may generate specific identify device (ID) data for each virtual device during a virtualization process.

For example, the memory controller 210 may divide the memory device 220 into a plurality of storage areas and generate specific ID data for each virtual device corresponding to the storage areas. The ID data may be used to identify each device in the I/O adapter 130A of the host 100A.

For example, the memory controller 210 divides a logical address or a virtual address corresponding to the storage area of the memory device 220 into a plurality of regions, and may generate specific ID data for each virtual device corresponding to a divided logical address region or a virtual address region.

For example, the memory controller 210 may set a storage capacity of the virtual device to be larger than an amount of storage space assigned to an actual device. Furthermore, a storage capacity may vary based on the virtual device.

For example, the memory controller 210 may perform a virtualization process so that each virtual device may have an independent virtual device abstraction.

The VD MT 210-3 includes pieces of information required for retrieving a logical address corresponding to a virtual address for each of the virtual devices. For example, the VD MT 210-3 may include read or write access authority setting information of the VMs in each storage area.

For example, the memory controller 210 may operate the DV SW 210-1 from the host 100A and generate a physical function device and at least one virtual device based on a virtualization request received from the host 100A. For example, the physical function device may be set as a virtual device having access authority to a VMM of the host 100A, and the virtual device may be set as a virtual device assigned to a VM of the host 100A.

For example, the memory controller 210 may operate the AC SW 210-2 and convert a virtual address corresponding to a virtual device into a physical address corresponding to a physical storage area in response to an access request received from the host 100A. In detail, the memory controller 210 may perform a resource mapping process converting the virtual address into a logical address by using the VD MT 210-3. Afterwards, the memory controller 210 may perform an address conversion process converting the logical address resulting from the resource mapping process into the physical address.

FIG. 1 illustrates an example of a configuration in which the single storage device 200 is connected to the host 100A. In another example, a plurality of storage devices 200 may be connected to the host 100A.

Figure 2:
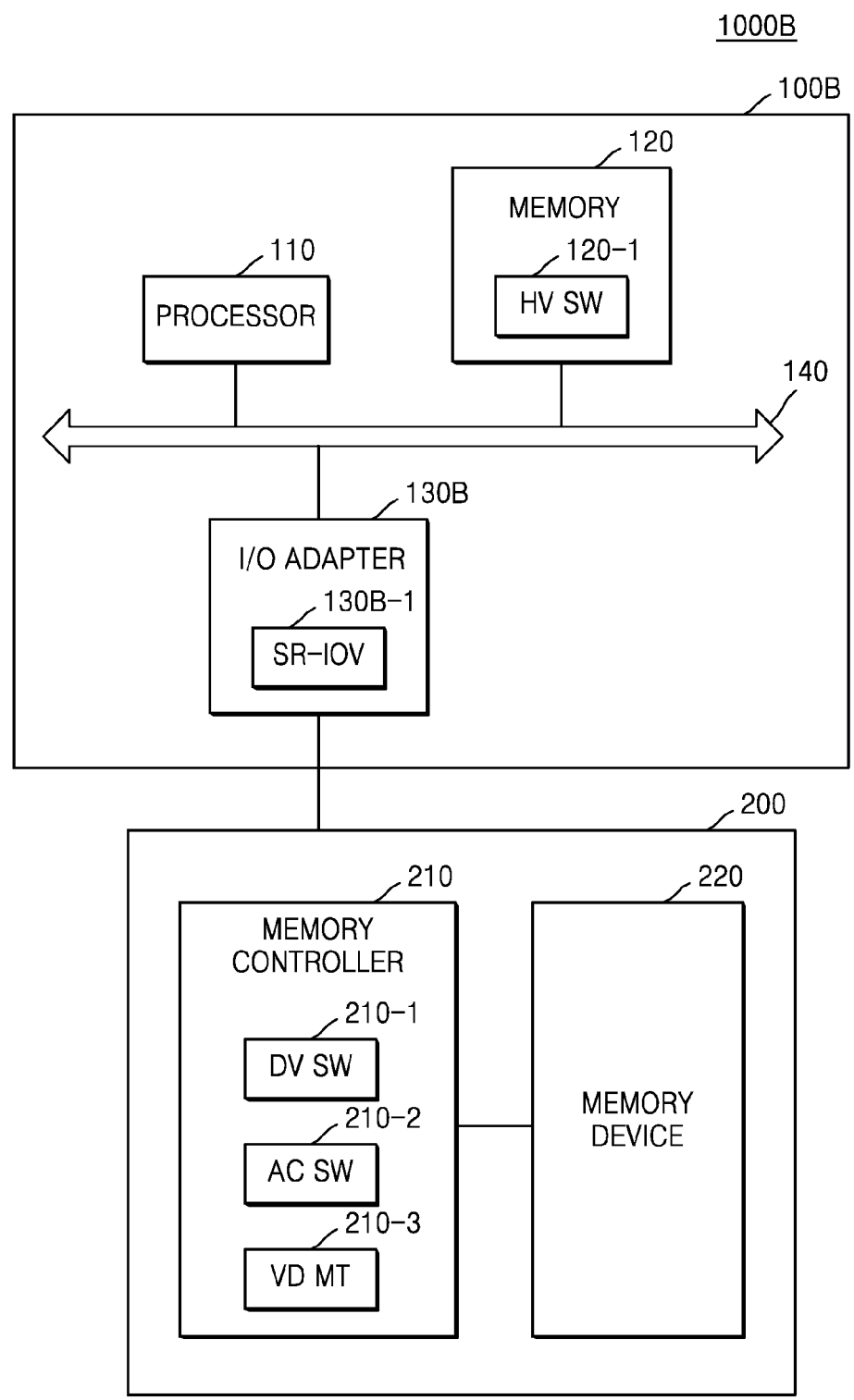
FIG. 2 is a block diagram illustrating a computing system according to another exemplary embodiment of the inventive concept.

FIG. 2 is a block diagram illustrating a computing system according to another exemplary embodiment of the inventive concept.

Referring to FIG. 2, the computing system 1000B includes a host 100B and a storage device 200. For example, the computing system 1000B may be a PC, a set-top box, modem, a mobile device, and a server.

The host 100B may include a processor 110, a memory 120, an I/O adapter 130B, and a bus 140. Components of the host 100B may exchange signals and data through the bus 140.

Since the processor 110 and the memory 120 of FIG. 2 are substantially the same as the processor 110 and memory 120 of FIG. 1, the repeated descriptions are omitted herein. Furthermore, since the storage device 200 of FIG. 2 is also substantially the same as the storage device 200 of FIG. 1, the repeated descriptions are omitted herein.

From among components of the computing system 1000B of FIG. 2, I/O adapter 130B will be mainly explained.

The I/O adapter 130B connects I/O devices to the host 100B. For example, the I/O adapter 130B may include a PCI or PCIe adapter, an SCSI adapter, a fiber channel adapter, a serial ATA, or the like. The I/O adapter 130B may include a circuit, interfaces, or code capable of communicating information with devices connected to the computing system 1000B. The I/O adapter 130B may include at least one standardized bus and at least one bus controller. Therefore, the I/O adapter 130B may recognize and assign identifier to devices connected to the bus 140, and may allocate resources to the various devices connected to the bus 140. That is, the I/O adapter 130B may manage communications along the bus 140. For example, the I/O adapter 130B may be a PCI or PCIe system, and the I/O adapter 130B may include a PCIe route complex and at least one PCIe switch or bridge. For example, the I/O adapter 130B may be controlled by a VMM.

I/O adapter 130B may include a single root-I/O virtualization (SR-IOV) function 130B-1. For example, the SR-IOV function 130B-1 has been developed to improve the I/O performance of a storage device in a server virtualization environment, and the SR-IOV function 130B-1 directly connects a VM of a server virtualization system to the storage device. Accordingly, in the computing system 1000B including the SR-IOV function 130B-1, at least one storage device or virtual device needs to be assigned to a single VM.

For reference, the SR-IOV function 130B-1 has a standard that enables a single PCIe physical device under a single root port to be represented as several individual physical devices on the VMM or a guest OS. A PCIe device that supports the SR-IOV function 130B-1 represents several instances of the PCIe device on the guest OS and the VMM. The number of virtual functions displayed may vary according to devices.

In a virtualization system to which the I/O adapter 130B including the SR-IOV function 130B-1 is applied, the I/O adapter 130B may directly connect the VMs with virtual devices of the storage device 200, rather than via the VMM. Therefore, VMs of the host 100B may be directly connected to the virtual function devices virtualized in the storage device 200, rather than via the VMM, by using the SR-IOV function 130B-1.

Figure 3:
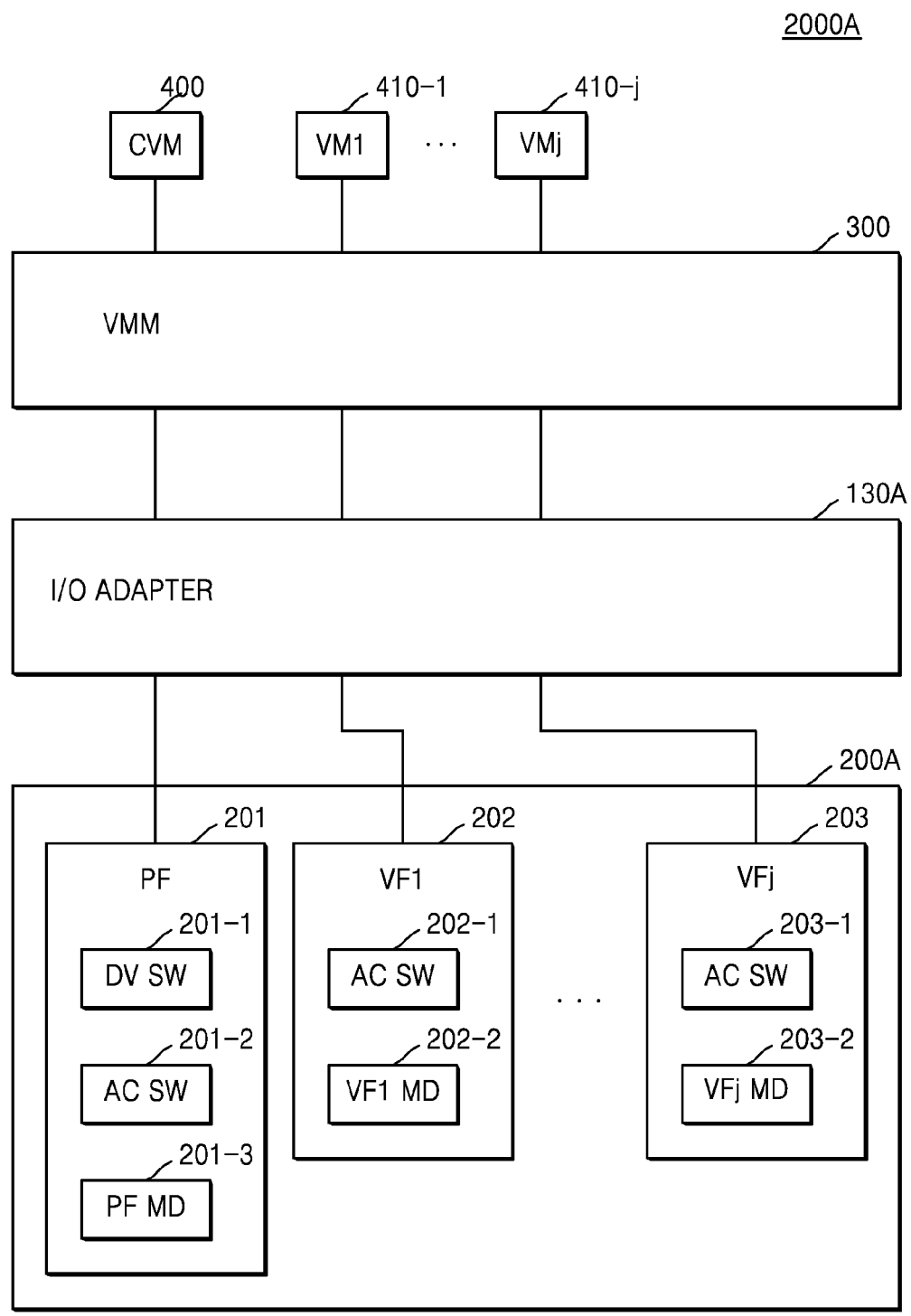
FIG. 3 is a block diagram illustrating a storage virtualization system according to an exemplary embodiment of the inventive concept.

FIG. 3 is a block diagram illustrating a storage virtualization system 2000A according to an exemplary embodiment of the inventive concept. For example, the storage virtualization system 2000A of FIG. 3 may be a virtualization system corresponding to the computing system 1000A of FIG. 1.

Referring to FIG. 3, the storage virtualization system 2000A includes a VMM 300, an I/O adapter 130A, a control virtual monitor (CVM) 400, a plurality of VMs (VM1 through VMj) 410-1 through 410-j, and a storage device 200A.

The VMM 300, the I/O adapter 130A, the CVM 400, and the VMs 410-1 through 410-j are software and/or hardware included in a host of a computing system.

Each of the VMs 410-1 through 410-j may operate an OS and application programs to act like a physical computer.

The storage device 200A includes a physical function device (PF) 201 and a plurality of virtual function devices (VF1 and VFj) 202 and 203. The PF 201 includes DV SW 201-1, AC SW 201-2, and physical function meta data (PF MD) 201-3. The VF1 202 includes AC SW 202-1 and VF1 MD 202-2, and the VFj 203 includes AC SW 203-1 and VFj MD 203-2.

The PF 201 controls a physical function of the storage device 200A and controls the VF1 and VFj 202 and 203. The PF 201 may generate or delete the VF1 and VFj 202 and 203 by operating the DV SW 201-1.

The PF 201 and the VF1 and VFj 202 and 203 have an independent configuration space, a memory space, and a message space.

The PF 201 may operate the AC SW 201-2 and convert a virtual address into a physical address corresponding to a physical storage area in response to an access request received from the host 100A. In detail, the PF 201 may perform a resource mapping process for converting the virtual address into a logical address by using the PF MD 201-3. Afterwards, the PF 201 may perform an address conversion process for converting the logical address resulting from the resource mapping process into the physical address. The PF MD 201-3 may include virtual device mapping table information for retrieving a logical address corresponding to a virtual address and address conversion table information for retrieving a physical address corresponding to a logical address. Furthermore, the PF MD 201-3 may include pieces of read or write access authority setting information corresponding to the VMs in each storage area.

The VF1 202 may operate the AC SW 202-1 and convert a virtual address into a physical address corresponding to a physical storage area in response to an access request received from the host 100A. In detail, the VF1 202 may perform a resource mapping process for converting the virtual address into a logical address by using the VF1 MD 202-2. Afterwards, the VF1 202 may perform an address conversion process for converting the logical address resulting from the resource mapping process into the physical address. The VF1 MD 202-2 may include virtual device mapping table information for retrieving a logical address corresponding to a virtual address assigned to the VF1 202 and address conversion table information for retrieving a physical address corresponding to a logical address. Furthermore, the VF1 MD 201-2 may include pieces of read or write access authority setting information corresponding to the VMs in each storage area.

The VFj 203 may also perform a resource mapping process and an address conversion process by using the same method used by the VF1 202.

The I/O adapter 130A transmits respective ID data about the PF 201 and the VF1 and VFj 202 and 203, the configuration space, the memory space, and the message space to the VMM 300 or the CVM 400.

The CVM 400 includes an interface for managing the VMM 300 and the VMs (VM1 through VMj) 410-1 through 410-j.

For example, the CVM 400 may assign the VF1 and VFj 202 and 203 to the VM1 through VMj 410-1 through 410-j. In another example, the VMM 300 may also assign the VF1 and VFj 202 and 203 to the VM1 through VMj 410-1 through 410-j.

Furthermore, the CVM 400 or the VMM 300 may perform resource mapping and access authority setting with respect to the PF 201 and the VF1 and VFj 202 and 203. For example, the PF 201 may provide an interface for the resource mapping and the access authority setting with respect to the VF1 and VFj 202 and 203 to the CVM 400 or the VMM 300. For example, an initialization operation with respect to the VF1 and VFj 202 and 203 may be performed through the PF 201.

The host manages the PF 201 so that software with an admin/root authority such as the VMM 300 or the CVM 400 may access the PF 201. Otherwise, security issues may occur due to improperly setting access authority.

Each VF1 and VFj 202 and 203 has independent virtual device abstraction. Capacity of a virtual device may be set at an initialization time of the virtual device. The capacity of the virtual device may be set to be larger than an amount of storage space assigned to an actual device. The function may be called a "thin provisioning function". During a write operation, the "thin provisioning function" grants access authority for accessing a block on which an actual write operation is to be performed. Therefore, the total capacity of all virtual devices provided by a storage device may be greater than physical storage capacity of an actual (e.g., physical) storage device. A storage space of the virtual device may be as large as the capacity of the virtual device and may be set differently for each virtual device.

In a virtualization process of the storage device 200A, read/write access authority may be set for each virtual block. A virtual block permitting only a read operation may be set as a copy-on-write block. A virtual block permitting only a write operation may also be set in the storage device 200A. The read/write access authority may be used for data transmission between two VMs by setting a block of one VM as "read-only" and a block of another VM as "write-only". In general, block-access authority may be set so that both read/write operations may be permitted.

Figure 4:
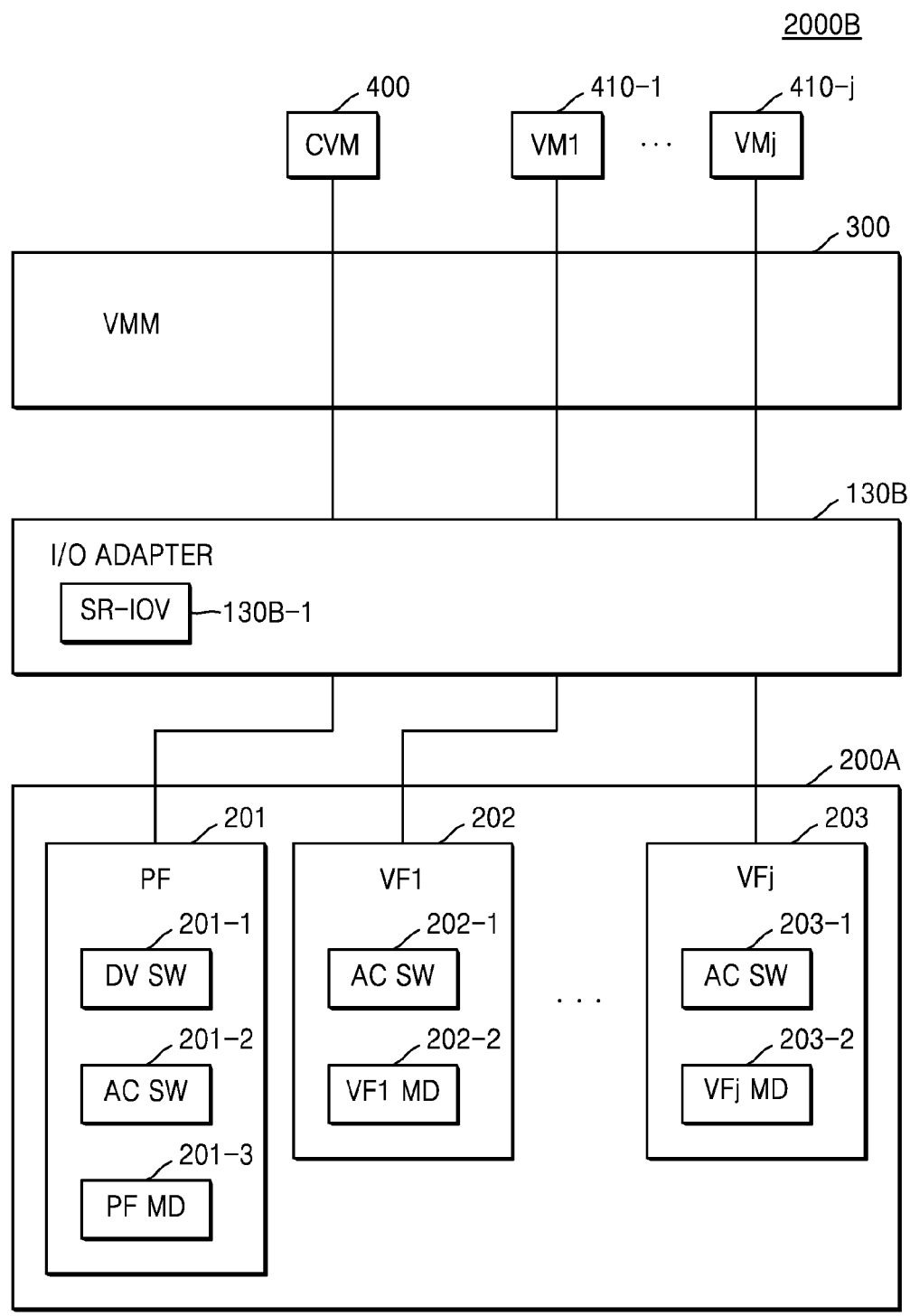
FIG. 4 is a block diagram illustrating a storage virtualization system according to another exemplary embodiment of the inventive concept.

FIG. 4 is a block diagram illustrating a storage virtualization system 2000B according to another exemplary embodiment of the inventive concept. For example, the storage virtualization system 2000B of FIG. 4 may be a virtualization system corresponding to the computing system 1000B of FIG. 2.

Referring to FIG. 4, the storage virtualization system 2000B includes a VMM 300, an I/O adapter 130B, a CVM 400, a plurality of VM1 through VMj 410-1 through 410-j, and a storage device 200A.

Since the VMM 300, the CVM 400, the VM1 through VMj 410-1 through 410-j, and the storage device 200A of FIG. 4 are substantially the same as the VMM 300, the CVM 400, the VM1 through VMj 410-1 through 410-j, and the storage device 200A included in the storage virtualization system 2000B of FIG. 3, repeated descriptions are omitted.

An I/O adapter 130B including an SR-IOV function 130B-1 is applied to the storage virtualization system 2000B. As described in FIG. 2, in the storage virtualization system 2000B to which the I/O adapter 130B including the SR-IOV function 130B-1 is applied, the CVM 400 and the VMs 410-1 through 410-j may be directly connected to virtual devices 201 to 203 of the storage device 200A, rather than via the VMM 300. That is, the CVM 400 and the VMs 410-1 through 410-j of a host may be directly connected to the PF 201 and the VF1 and VFj 202 and 203 of the storage device 200A, rather than via the VMM 300.

Figure 5:
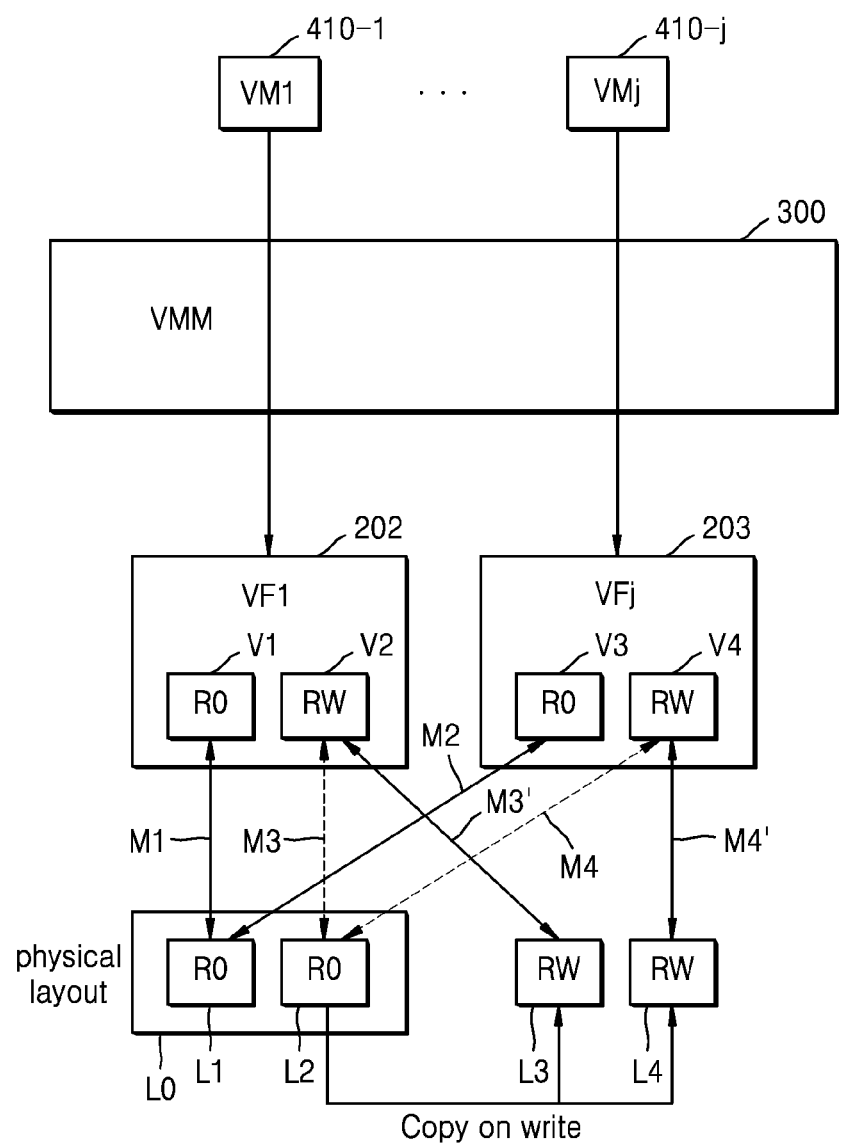
FIG. 5 is a diagram illustrating a flow of an access-control operation in a storage virtualization system according to an exemplary embodiment of the inventive concept.

FIG. 5 is a diagram illustrating a flow of an access-control operation in a storage virtualization system according to an exemplary embodiment of the inventive concept.

For example, FIG. 5 illustrates a main configuration to explain an access-control operation in the storage virtualization system 2000B of FIG. 4.

In FIG. 5, access authority of a virtual block address V1 is set as "read-only (RO)" and that of a virtual block address V2 is set as "read/write (RW)" in an address region assigned to a VF1 202. In the same way, it may be assumed that access authority of a virtual block address V3 is set as "read-only (RO)" and that of a virtual block address V4 is set as "read/write (RW)" in an address region assigned to a VFj 203.

The "Virtual address" mentioned above may be referred to as "virtual block address", "virtual logical block address" or "pseudo logical block address". Furthermore, "logical address" may be referred to as "logical block address".

The virtual block addresses V1 and V3 in which the access authority is set as "read-only (RO)" permit only a read operation and not a write operation. The virtual block addresses V2 and V4 in which the access authority is set as "read/write (RW)" permit both read and write operations.

For example, a storage area L0 of a physical layout in which data is actually stored represents a logical address region corresponding to a virtual address region in which access authority is set as "read-only (RO)", in the storage device 200A. Remaining storage areas other than the storage area L0 represent logical address regions corresponding to virtual address regions in which access authority is set as "read/write (RW)". Therefore, logical block addresses L1 and L2 represent logical address regions corresponding to virtual address regions in which access authority is set as "read-only (RO)", and logical block addresses L3 and L4 represent logical address regions corresponding to virtual address regions in which access authority is set as "read/write (RW)".

Referring to FIG. 5, mapping information M1 and M2 in virtual device mapping table information of VF1 MD 202-2 corresponding to the VF1 202 shows that the logical block address L1 is respectively mapped to the virtual block addresses V1 and V3. Furthermore, mapping information M3 and M4 shows that the logical block address L2 is respectively mapped to the virtual block addresses V2 and V4.

If a write request with respect to a logical block address in which access authority is set as "read-only (RO)" is generated in a state of setting access authority of logical block addresses to copy-on-write, a new block is assigned and added to a mapping table after copying data in a storage area corresponding to the new block.

For example, when the VF1 202 receives a write request to the virtual block address V2 corresponding to the logical block address L2, the VF1 202 operates as described below when a copy-on-write option is set.

Since access authority of the logical block address L2 is set as "read-only (RO)", a write operation may be not performed on the logical block address L2. Therefore, a new logical block address L3 other than the logical block address L2 in which the access authority is set as "read-only (RO)" is assigned. Furthermore, the logical block address L3 is added to the mapping table after data stored in the logical block address L2 is copied to the logical block address L3. That is, mapping information M3 which maps the logical block address L2 to the virtual block address V2 is changed to mapping information M3' which maps the logical block address L3 to the virtual block address V2.

In the same way, when the VFj 203 receives a write request to the virtual block address V4 corresponding to the logical block address L2, the VFj 203 operates as described below when a copy-on-write option is set.

Since access authority of the logical block address L2 is set as "read-only (RO)", a write operation may be not performed on the logical block address L2. Therefore, a new logical block address L4 is assigned other than the logical block address L2 in which the access authority is set as "read-only (RO)". Furthermore, the logical block address L4 is added to the mapping table after data stored in the logical block address L2 is copied thereto. That is, mapping information M4 which maps the logical block address L2 to the virtual block address V4 is changed to mapping information M4' which maps the logical block address L4 to the virtual block address V4.

Figure 6:
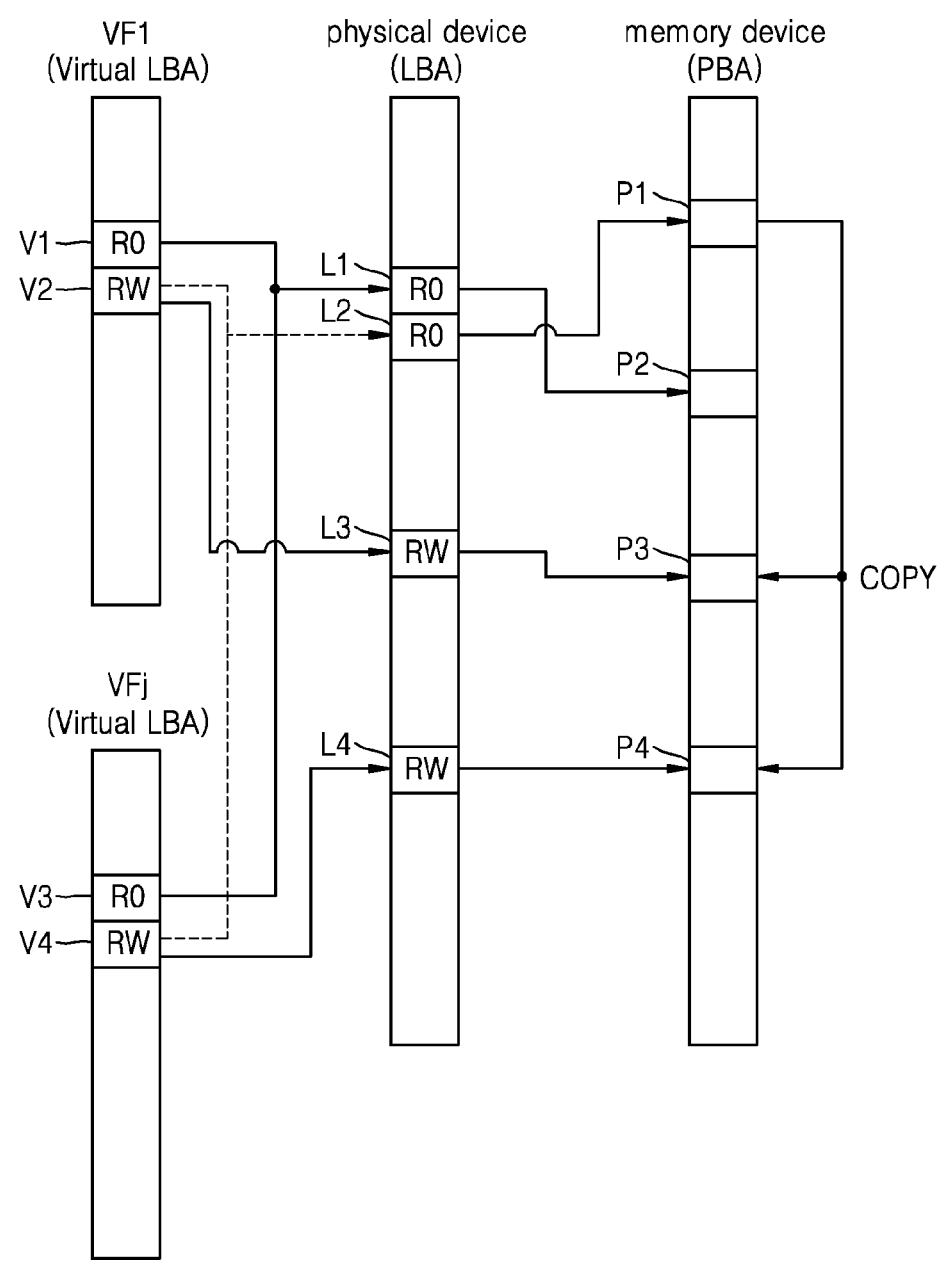
FIG. 6 is a diagram illustrating a mapping table update operation according to an access-control operation in a storage virtualization system, according to an exemplary embodiment of the inventive concept.

FIG. 6 is a diagram illustrating a mapping table update operation according to an access-control operation in a storage virtualization system, according to an exemplary embodiment of the inventive concept.

FIG. 6 illustrates a mapping table update operation according to an access-control operation when access authority is set as in FIG. 5.

Referring to FIG. 6, mapping information indicating respective virtual logical block addresses (virtual LBAs), logical block addresses (LBAs), and physical block addresses (PBAs) of virtual function devices VF1 and VFj before a write request for virtual LBAs V2 and V4 are generated is as described below.

Mapping information indicating virtual LBAs V1 to V4 of virtual function devices VF1 and VFj is (V1, L1, P2), (V2, L2, P1), (V3, L1, P2), and (V4, L2, P1). In another example, the mapping information may be divided into a piece of mapping table information corresponding to the virtual LBA and the LBA and a piece of mapping table information corresponding to mapping of the LBA and the PBA.

If a write request with respect to the virtual LBA V2 is generated in a state of setting the mapping information as described above, a write operation is not permitted in an LBA L2 since access authority of the LBA L2 assigned to the virtual LBA V2 is set as "read-only (RO)".

Therefore, the virtual function device VF1 assigns a new LBA L3 and a PBA P3 in which read/write access authority is set to a physical function device and data stored in a PBA P1 is copied to the PBA P3. Afterwards, the mapping information (V2, L2, P1) is changed to (V2, L3, P3).

Next, if a write request with respect to the virtual LBA V4 is generated, a write operation is not permitted in an LBA L2 since access authority is set as "read-only (RO)" in the LBA L2 assigned to the virtual LBA V4.

Therefore, the virtual function device VFj assigns a new LBA L4 and a PBA P4 in which read/write access authority is set to a physical function device and data stored in a PBA P1 is copied to the PBA P4. Afterwards, the mapping information (V4, L2, P1) is changed to (V4, L4, P4).

It is possible to improve performance and extend the life of a memory device by using a copy-on-write function to copy only data located in a partial region which is actually updated in a storage area of the memory device shared by VMs. That is, it is possible to reduce unnecessary writing/copying of data in a virtualization system. Furthermore, the memory device is not vulnerable to viruses, as access-control information is stored in a storage device of the memory device rather than a host.

Figure 7:
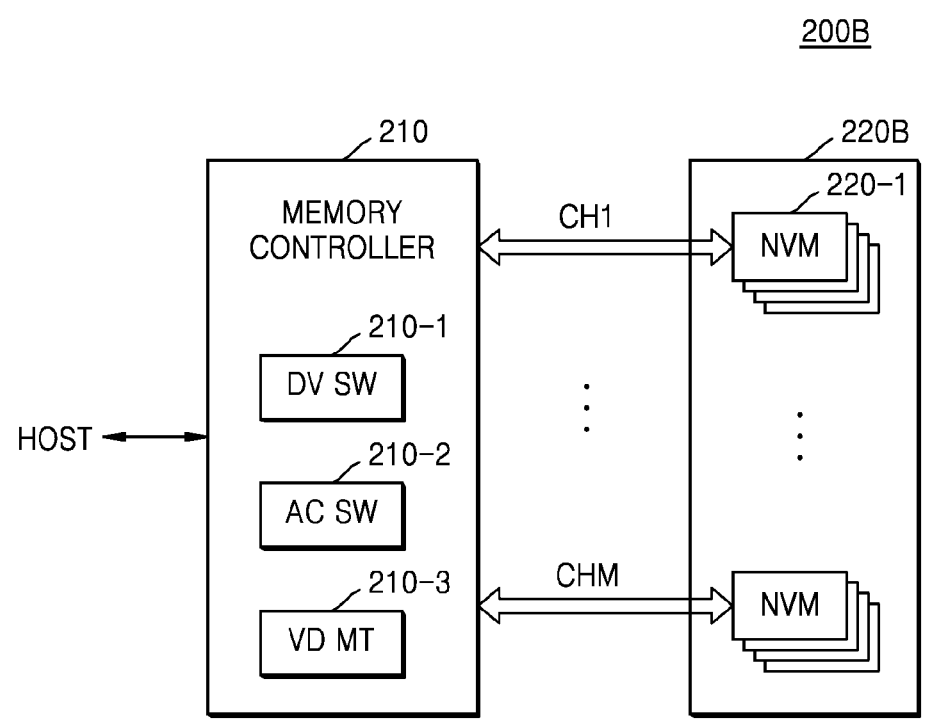
FIG. 7 is a block diagram illustrating a storage device according to an exemplary embodiment of the inventive concept.

FIG. 7 is a block diagram illustrating a storage device according to an exemplary embodiment of the inventive concept.

For example, the storage device 200 of the computing system 1000A of FIGS. 1 and 2 or the storage device 200A of the storage virtualization system of FIGS. 3 and 4 may be implemented by a storage device 200B of FIG. 7.

Referring to FIG. 7, the storage device 200B includes a memory controller 210 and a memory device 220B. For example, the storage device 200B may be implemented by using an SSD.

The memory controller 210 may perform a control operation with respect to the memory device 220B based on a command received from a host. In detail, the memory controller 210 may control program (or write), read and erasure operations with respect to the memory device 220B by providing address, command and control signals through a plurality of channels CH1 to CHM.

The memory controller 210 may store a DV SW 210-1, an AC SW 210-2, and a VD MT 210-3.

It is possible to set a physical storage device as a plurality of virtual storage devices by operating the DV SW 210-1 of the memory controller 210. In detail, the memory controller 210 may perform an operation for generating identify device (ID) data about each virtual device so that a single physical storage device may be recognized as a plurality of virtual devices.

For example, the memory controller 210 may divide a storage area of the memory device 220B into a plurality of storage areas that are initialized and may generate specific ID data about each virtual device corresponding to the storage areas. Furthermore, the memory controller 210 generates address, command and control signals for writing a plurality of pieces of the ID data generated in each storage area to the memory device 220B. Furthermore, the memory controller 210 generates address, command and control signals for writing information about storage capacity of each virtual device and a physical address region to the memory device 220B.

For example, the memory controller 210 may generate a plurality of pieces of ID data so that a single physical storage device may be recognized as a plurality of virtual devices based on an initialized device virtualization command. Furthermore, the memory controller 210 may control the plurality of pieces of the generated ID data so as to write the ID data to the memory device 220B.

For example, a device virtualization command may be provided to the memory controller 210 through a producer manage tool in a storage device manufacturing process. In another example, in a state of connecting a storage device to a host under a user condition, a device virtualization command may be provided to the memory controller 210 through the host.

For example, ID data may include information about a model name, a firmware revision, a serial number, a world-wide name (WWN), a physical logical sector size, a feature, and the like based on a serial advanced technology attachment (SATA) standard.

At least the information about the serial number and the WWN from among the pieces of information included in ID data for each virtual device corresponding to a physical storage device may be set differently.

For example, when one physical storage device is divided into N (where N is an integer of 2 or more) virtual devices, the storage capacity of each virtual device may be set to be a capacity obtained by dividing a maximum number of logical block addresses (max LBAs) of the physical storage device by N.

In another example, capacity of a virtual device may be set to be greater than a storage space assigned to an actual device. For example, only a block in which an actual write operation is performed is assigned when the write operation is performed. Therefore, the total capacity of all virtual devices provided by a storage device may be greater than physical storage capacity of an actual storage device. A storage space of the virtual device is as large as the capacity of the virtual device and may be set differently for each virtual device. A block size of the virtual device does not need to be equal to that of the logical device, but may not be smaller than that of a logical device. That is, a size of a virtual LBA is set to be equal to or larger than that of an LBA.

In a virtualization process of the storage device 200B in the memory controller 210, read/write access authority may be set with respect to a virtual block. A virtual block permitting only a read operation may be set as a copy-on-write block. A virtual block permitting only a write operation may also be set in the storage device 200B. The information about setting the access authority may be included in virtual device mapping table information.

When an identify device (ID) command is transmitted from the host to the memory controller 210 after setting a plurality of pieces of the ID data, the memory controller 210 transmits the ID data to the host. In detail, the memory controller 210 may read a plurality of pieces of the ID data from the memory device 220B and transmit a plurality of pieces of the read ID data to the host.

The memory controller 210 may perform the access-control operation described in FIGS. 5 and 6 by using the AC SW 210-2 and the VD MT 210-3.

The memory device 220B may include at least one non-volatile memory chip (NVM) 220-1. For example, the NVM 220-1 included in the memory device 220B may be not only a flash memory chip, but may also be a phase change RAM (PRAM) chip, a ferroelectric RAM (FRAM) chip, a magnetic RAM (MRAM) chip, or the like. In another example, the memory device 220B may include at least one non-volatile memory chip and at least one volatile memory chip, or may include at least two types of non-volatile memory chips.

Figure 8:
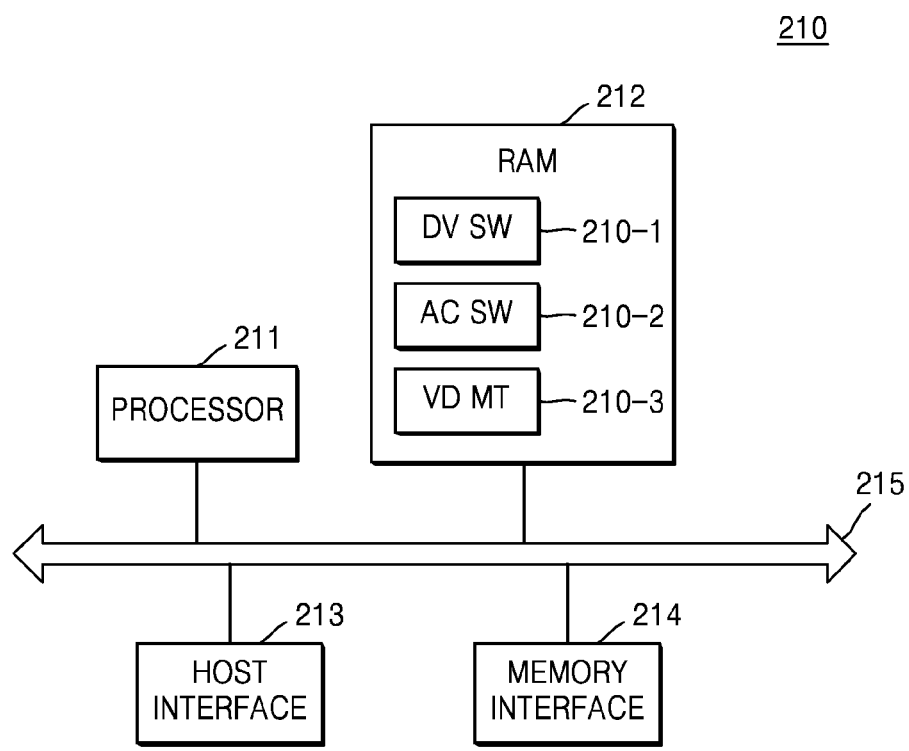
FIG. 8 is a block diagram illustrating a detailed configuration of a memory controller in FIG. 7, according to an exemplary embodiment of the inventive concept.

FIG. 8 is a block diagram illustrating a detailed configuration of the memory controller 210 in FIG. 7, according to an exemplary embodiment of the inventive concept.

As shown in FIG. 8, the memory controller 210 includes a processor 211, a random access memory (RAM) 212, a host interface 213, a memory interface 214, and a bus 215.

The components of the memory controller 210 are electrically connected to each other via the bus 215.

The processor 211 may control an overall operation of the storage device 200B by using program code and pieces of data that are stored in the RAM 212. When the storage device 200B is initialized, the processor 211 may read from the memory device 220B program code and data which are necessary for controlling operations performed by the storage device 200B, and may load the read program code and data into the RAM 212.

For example, the processor 211 may read from the memory device 220B a DV SW 210-1, an AC SW 210-2, and a VD MT 210-3 and load the read DV SW 210-1, AC SW 210-2, and VD MT 210-3 into the RAM 212.

For example, the processor 211 loads one piece of ID data into the RAM 212 before executing the DV SW 210-1. After executing the DV SW 210-1, the processor 211 loads a plurality of pieces of ID data into the RAM 212.

When the processor 211 receives the device virtualization command via the host interface 213, the processor 211 divides a physical storage device into a plurality of virtual devices. For example, the processor 211 may set a plurality of pieces of ID data for one physical storage device.

For example, when receiving the ID command, the processor 211 may read the plurality of pieces of ID data from the RAM 212 and transmit the same to the host via the host interface 213.

The RAM 212 stores data that is received via the host interface 213 or data that is received from the memory device 220B via the memory interface 214. The RAM 212 may also store data that has been processed by the processor 211. For example, the RAM 212 may store the plurality of pieces of ID data set in response to the device virtualization command.

The host interface 213 includes a protocol for exchanging data with a host that is connected to the memory controller 210, and the memory controller 210 may interface with the host via the host interface 213. The host interface 213 may be implemented by using, but not limited to, an ATA interface, an SATA interface, a parallel advanced technology attachment (PATA) interface, a universal serial bus (USB) or serial attached small computer system (SAS) interface, an SCSI, an embedded multimedia card (eMMC) interface, or a universal flash storage (UFS) interface. The host interface 213 may receive a command, an address, and data from the host under the control of the processor 211 or may transmit data to the host.

The memory interface 214 is electrically connected to the memory device 220B. The memory interface 214 may transmit a command, an address, and data to the memory device 220B under the control of the processor 211 or may receive data from the memory device 220B. The memory interface 214 may be configured to support NAND flash memory or NOR flash memory. The memory interface 214 may be configured to perform software or hardware interleaving operations via a plurality of channels.

Figure 9:
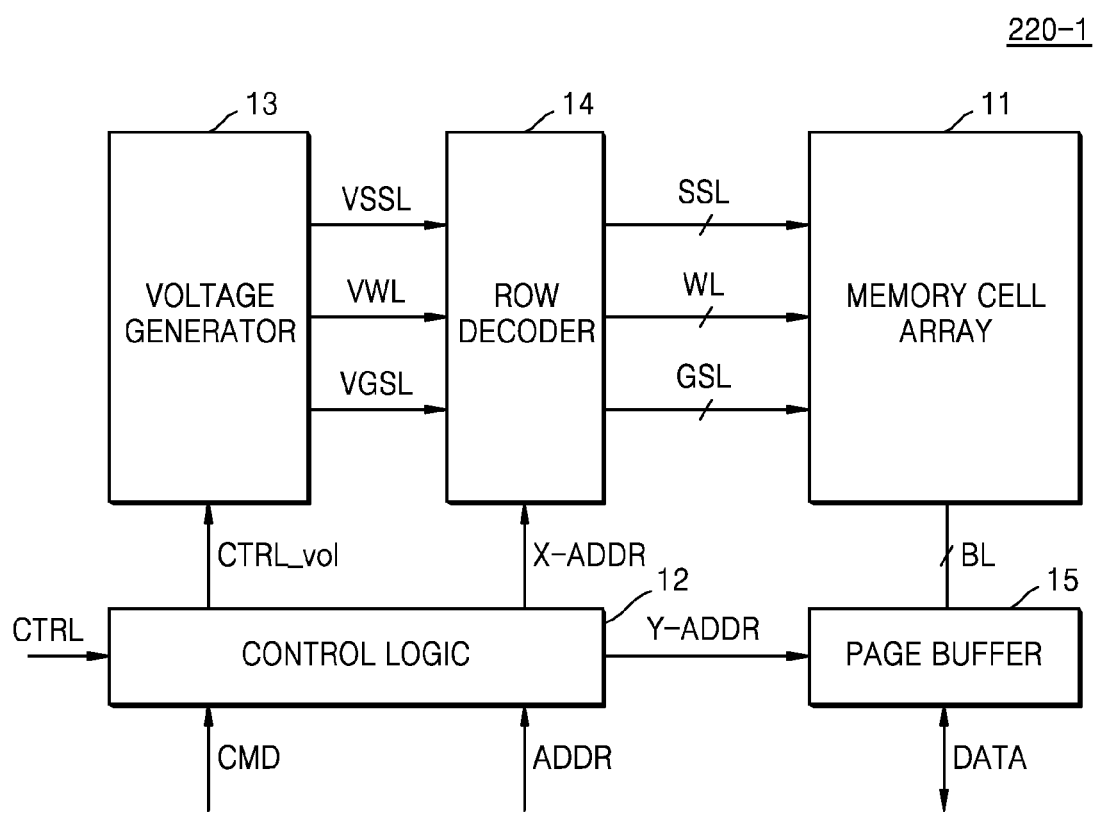
FIG. 9 is a block diagram illustrating a detailed configuration of a non-volatile memory chip configuring a memory device in FIG. 7, according to an exemplary embodiment of the inventive concept.

FIG. 9 is a block diagram illustrating a detailed configuration of a non-volatile memory chip configuring the memory device 220B in FIG. 7, according to an exemplary embodiment of the inventive concept. For example, the NVM 220-1 may be a flash memory chip.

Referring to FIG. 9, the NVM 220-1a may include a memory cell array 11, control logic 12, a voltage generator 13, a row decoder 14, and a page buffer 15. The components included in the NVM 220-1 will now be described in detail.

The memory cell array 11 may be connected to at least one string selection line SSL, a plurality of word lines WL, and at least one ground selection line GSL, and may also be connected to a plurality of bit lines BL. The memory cell array 11 may include a plurality of memory cells MC (see FIG. 11) that are disposed at intersections of the plurality of bit lines BL and the plurality of word lines WL.

When an erasure voltage is applied to the memory cell array 11, the plurality of memory cells MC enter an erasure state. When a programming voltage is applied to the memory cell array 11, the plurality of memory cells MC enter a programmed state. Each memory cell MC may have one selected from an erasure state and first through n-th programmed states P1 through Pn that are distinguished from each other according to a threshold voltage.

In the first through n-th programmed states P1 through Pn, n may be a natural number equal to or greater than 2. For example, when each memory cell MC is a 2-bit level cell, n may be 3. In another example, when each memory cell MC is a 3-bit level cell, n may be 7. In another example, when each memory cell MC is a 4-bit level cell, n may be 15. As such, the plurality of memory cells MC may include multilevel cells. However, embodiments of the inventive concept are not limited thereto, and the plurality of memory cells MC may include single-level cells.

The control logic 12 may receive a command signal CMD, an address signal ADDR, and a control signal CTRL from the memory controller 210 to output various control signals for writing the data to the memory cell array 11 or for reading the data from the memory cell array 11. In this way, the control logic 12 may control overall operations of the NVM 220-1.

The various control signals output by the control logic 12 may be provided to the voltage generator 13, the row decoder 14, and the page buffer 15. In detail, the control logic 12 may provide a voltage control signal CTRL_vol to the voltage generator 13, may provide a row address signal X_ADDR to the row decoder 14, and may provide a column address signal Y_ADDR to the page buffer 15.

The voltage generator 13 may receive the voltage control signal CTRL_vol to generate various voltages for executing a program operation, a read operation and an erasure operation with respect to the memory cell array 11. In detail, the voltage generator 13 may generate a first drive voltage VWL for driving the plurality of word lines WL, a second drive voltage VSSL for driving the at least one string selection line SSL, and a third drive voltage VGSL for driving the at least one ground selection line GSL.

The first drive voltage VWL may be a program (or write) voltage, a read voltage, an erasure voltage, a pass voltage, or a program verification voltage. The second drive voltage VSSL may be a string selection voltage, namely, an on voltage or an off voltage. The third drive voltage VGSL may be a ground selection voltage, namely, an on voltage or an off voltage.

The row decoder 14 may be connected to the memory cell array 11 through the plurality of word lines WL and may activate some of the plurality of word lines WL in response to the row address signal X_ADDR received from the control logic 12. In detail, during a read operation, the row decoder 14 may apply a read voltage to a word line selected from the plurality of word lines WL and apply a pass voltage to the remaining unselected word lines.

During a program operation, the row decoder 14 may apply a program voltage to the selected word line and apply the pass voltage to the unselected word lines. According to the present embodiment, the row decoder 14 may apply a program voltage to the selected word line and an additionally selected word line, in at least one selected from a plurality of program loops.

The page buffer 15 may be connected to the memory cell array 11 via the plurality of bit lines BL. In detail, during a read operation, the page buffer 15 may operate as a sense amplifier so as to output data DATA stored in the memory cell array 11. During a program operation, the page buffer 15 may operate as a write driver so as to input data DATA to be stored in the memory cell array 11.

Figure 10:
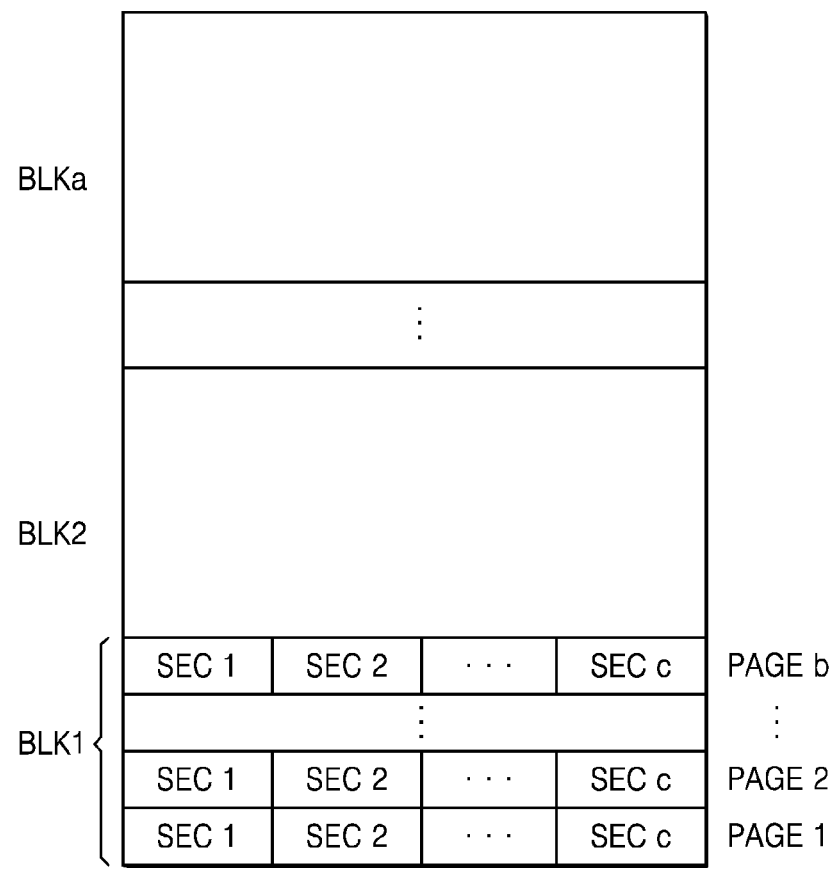
FIG. 10 is a diagram illustrating a memory cell array in FIG. 9, according to an exemplary embodiment of the inventive concept.

FIG. 10 is a view of the memory cell array 11 in FIG. 9, according to an exemplary embodiment of the inventive concept.

Referring to FIG. 10, the memory cell array 11 may be a flash memory cell array. In this case, the memory cell array 11 may include a plurality of memory blocks BLK1, . . . and BLKa (where "a" is a positive integer which is equal to or greater than two) and each of the memory blocks BLK1, . . . , and BLKa may include a plurality of pages PAGE1, . . . , and PAGEb (where "b" is a positive integer which is equal to or greater than two). In addition, each of the pages PAGE1, . . . , and PAGEb may include a plurality of sectors SEC1, . . . , and SECc (where "c" is a positive integer which is equal to or greater than two). For convenience of explanation in FIG. 10, the pages PAGE1 through PAGEb and the sectors SEC1 through SECc of the memory block BLK1 only are illustrated, and the other memory blocks BLK2 through BLKa may have the same structures as that of the memory block BLK1.

Figure 11:
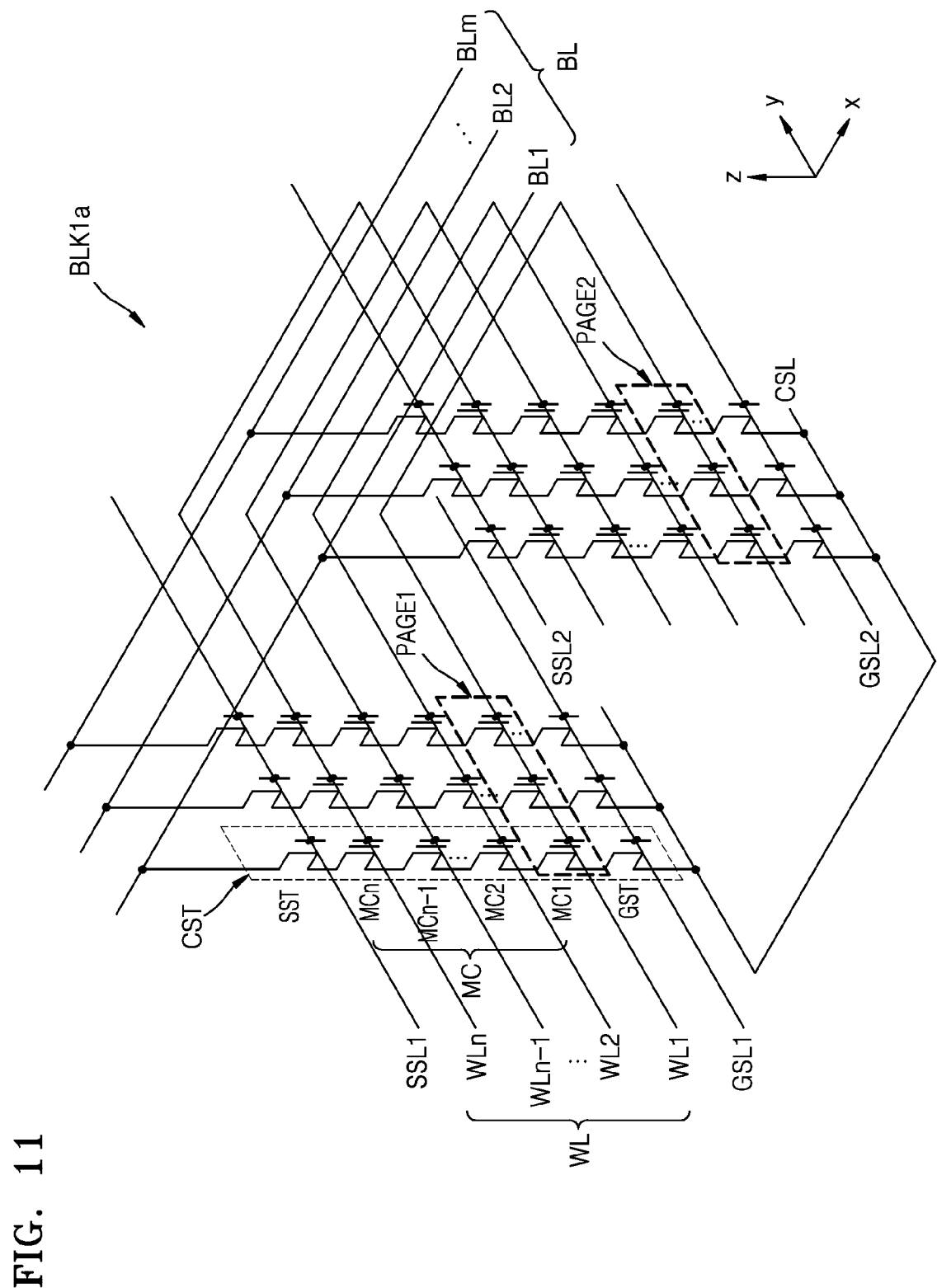
FIG. 11 is a circuit diagram of a first memory block included in a memory cell array in FIG. 9, according to an exemplary embodiment of the inventive concept.

FIG. 11 is a circuit diagram of a first memory block BLK1a included in the memory cell array in FIG. 9, according to an exemplary embodiment of the inventive concept.

Referring to FIG. 11, the first memory block BLK1a may be a NAND flash memory having a vertical structure. In FIG. 11, a first direction is referred to as an x direction, a second direction is referred to as a y direction, and a third direction is referred to as a z direction. However, embodiments of the inventive concept are not limited thereto, and the first through third directions may vary.

The first memory block BLK1a may include a plurality of cell strings CST, a plurality of word lines WL, a plurality of bit lines BL, a plurality of ground selection lines GSL1 and GSL2, a plurality of string selection lines SSL1 and SSL2, and a common source line CSL. The number of cell strings CST, the number of word lines WL, the number of bit lines BL, the number of ground selection lines GSL1 and GSL2, and the number of string selection lines SSL1 and SSL2 may vary according to embodiments.

Each of the cell strings CST may include a string selection transistor SST, a plurality of memory cells MC, and a ground selection transistor GST that are serially connected to each other between a bit line BL corresponding to the cell string CST and the common source line CSL. However, embodiments of the inventive concept are not limited thereto. According to another embodiment, each cell string CST may further include at least one dummy cell. According to another embodiment, each cell string CST may include at least two string selection transistors SST or at least two ground selection transistors GST.

Each cell string CST may extend in the third direction (z direction). In detail, each cell string CST may extend in a vertical direction (z direction) perpendicular to the substrate. Accordingly, the first memory block BLK1a including the cell strings CST may be referred to as a vertical-direction NAND flash memory. As such, by extending each cell string CST in the vertical direction (z direction), the integration density of the memory cell array 11 may be increased.

The plurality of word lines WL may each extend in the first direction x and the second direction y, and each word line WL may be connected to memory cells MC corresponding thereto. Accordingly, a plurality of memory cells MC arranged adjacent to each other on the same plane in the second direction y may be connected to each other by the same word line WL. In detail, each word line WL may be connected to gates of memory cells MC to control the memory cells MC. In this case, the plurality of memory cells MC may store data and may be programmed, read, or erased via the connected word line WL.

The plurality of bit lines BL may extend in the first direction x and may be connected to the string selection transistors SST. Accordingly, a plurality of string selection transistors SST arranged adjacent to each other in the first direction x may be connected to each other by the same bit line BL. In detail, each bit line BL may be connected to drains of the plurality of string selection transistors SST.

The plurality of string selection lines SSL1 and SSL2 may each extend in the second direction y and may be connected to the string selection transistors SST. Accordingly, a plurality of string selection transistors SST arranged adjacent to each other in the second direction y may be connected to each other by string selection line SSL1 or SSL2. In detail, each string selection line SSL1 or SSL2 may be connected to gates of the plurality of string selection transistors SST to control the plurality of string selection transistors SST.

The plurality of ground selection lines GSL1 and GSL2 may each extend in the second direction y and may be connected to the ground selection transistors GST. Accordingly, a plurality of ground selection transistors GST arranged adjacent to each other in the second direction y may be connected to each other by ground selection line GSL1 or GSL2. In detail, each ground selection line GSL1 or GSL2 may be connected to gates of the plurality of ground selection transistors GST to control the plurality of ground selection transistors GST.

The ground selection transistors GST respectively included in the cell strings CST may be connected to each other by the common source line CSL. In detail, the common source line CSL may be connected to sources of the ground selection transistors GST.

A plurality of memory cells MC connected to the same word line WL and to the same string selection line, for example, string selection line SSL1 or SSL2 and arranged adjacent to each other in the second direction y may be referred to as a page PAGE. For example, a plurality of memory cells MC connected to a first word line WL1 and to a first string selection line SSL1 and arranged adjacent to each other in the second direction y may be referred to as a first page PAGE1. A plurality of memory cells MC connected to the first word line WL1 and to a second string selection line SSL2 and arranged adjacent to each other in the second direction y may be referred to as a second page PAGE2.

To perform a program operation with respect to a memory cell MC, 0V may be applied to a bit line BL, an on voltage may be applied to a string selection line SSL, and an off voltage may be applied to a ground selection line GSL. The on voltage may be equal or greater than the threshold voltage so that a string selection transistor SST is turned on, and the off voltage may be smaller than the threshold voltage so that the ground selection transistor GST is turned off. A program voltage may be applied to a memory cell selected from the memory cells MC, and a pass voltage may be applied to the remaining unselected memory cells. In response to the program voltage, electric charges may be injected into the memory cells MC due to F-N tunneling. The pass voltage may be greater than the threshold voltage of the memory cells MC.

To perform an erasure operation with respect to the memory cells MC, an erasure voltage may be applied to the body of the memory cells MC, and 0V may be applied to the word lines WL. Accordingly, data stored in the memory cells MC may be temporarily erased.

Figure 12:
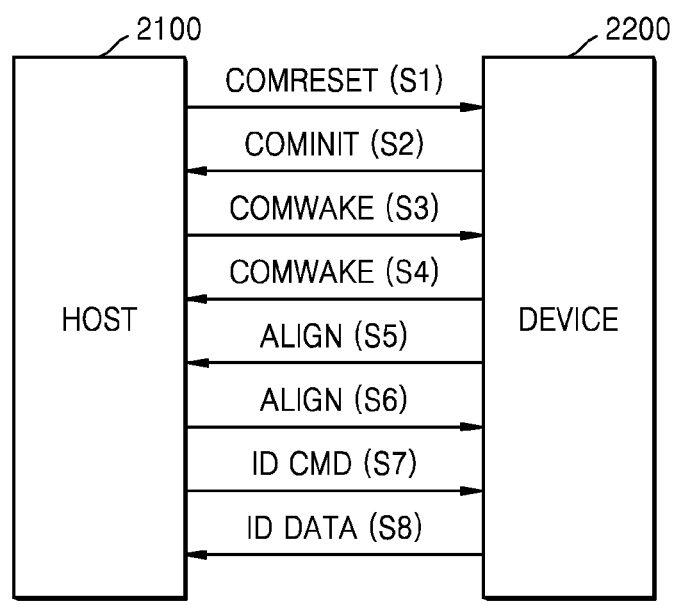
FIG. 12 is a schematic view illustrating an out of band (OOB) sequence between a host and a device in a storage virtualization system and a device-recognition method, according to an embodiment of the inventive concept.

FIG. 12 is a schematic view illustrating an out of band (OOB) sequence between a host and a device in a storage virtualization system and a device-recognition method, according to an embodiment of the inventive concept.

For example, a host 2100 may be the host 100A or 100B of FIG. 1 or 2, and a device 2200 may be the storage device 200 of FIG. 2.

First, an initialization process based on an OOB sequence according to the SATA standard will now be described.

In operation S1, the host 2100 transmits a COMRESET signal, which is an analog signal, to the device 2200. In operation S2, after confirming reception of the COMRESET signal, the device 2200 transmits a COMINIT signal, which is an analog signal, to the host 2100. In operation S3, after confirming reception of the COMINIT signal, the host 2100 transmits a COMWAKE signal, which is an analog signal, to the device 2200. In operation S4, after confirming reception of the COMWAKE signal, the device 2200 transmits a COMWAKE signal, which is an analog signal, to the host

2100. Then, in operations S5 and S6, the host 2100 and the device 2200 adjust a communication speed while exchanging a primitive align signal ALIGN. In this way, the initialization process is completed.

Next, the device recognition process which is performed after the initialization process is completed will now be described.

In operation S7, the host 2100 transmits an ID command ID CMD to the device 2200.

In operation S8, in response to the ID command ID CMD, the device 2200 transmits ID data ID_DATA set by the device 2200 to the host 2100. Once the device 2200 has been virtualized, the device 2200 transmits a plurality of pieces of ID data to the host 2100. Accordingly, the host 2100 recognizes the physical device 2200 as a plurality of virtual devices.

A device virtualization method performed in a computing system and a device recognition method performed in a storage virtualization system according to an embodiment of the inventive concept will now be described.

Figure 13:
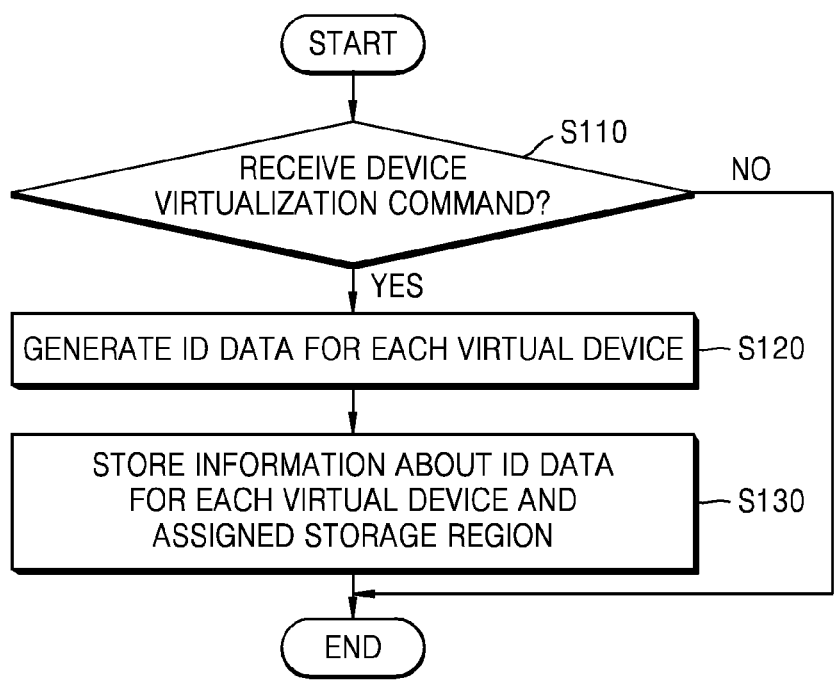
FIG. 13 is a flowchart of a device virtualization method in a storage device according to an embodiment of the inventive concept.
Figure 14:
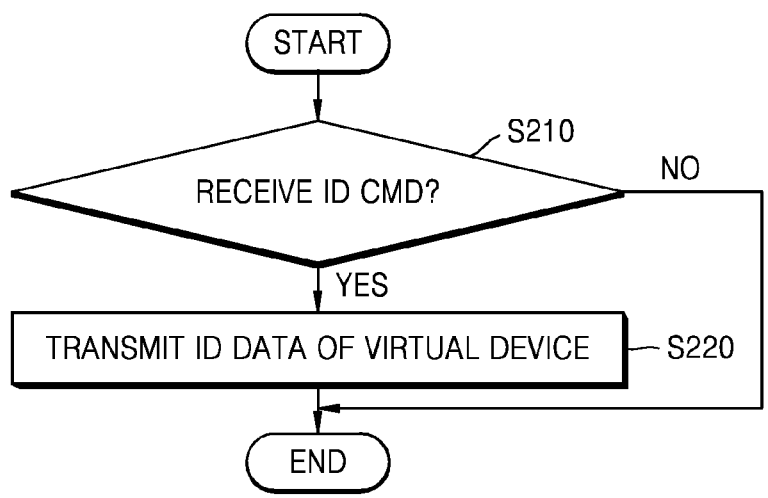
FIG. 14 is a flowchart illustrating a method of processing a device recognition command in a storage device according to an embodiment of the inventive concept.

Methods illustrated in FIGS. 13 and 14 may be performed by the memory controller 210 of FIG. 7. In detail, the methods of FIGS. 13 and 14 may be performed under the control of the processor 211 of the memory controller 210 of FIG. 8.

FIG. 13 is a flowchart of a device virtualization method in the storage device 200B according to an embodiment of the inventive concept.

In operation S110, the memory controller 210 of the storage device 200B determines whether a device virtualization command is received. For example, the device virtualization command may be received from the host 100A of FIG. 1 or the host 100B of FIG. 2. In another example, the device virtualization command may be received via a manufacturer management tool during a device manufacturing process.

In operation S120, in response to the device virtualization command, the memory controller 210 of the storage device 200B generates a plurality of pieces of ID data so that one physical storage device is recognized as a plurality of storage devices.

For example, the memory controller 210 divides a storage area into a plurality of storage areas and generates respective ID data in each storage area. In another example, capacity of a virtual device may be set to be greater than a storage space assigned to an actual device. For example, only a block in which an actual write operation is performed is assigned when the write operation is performed. Therefore, the total capacity of all virtual devices provided by the storage device 200B may be greater than physical storage capacity of an actual storage device. A storage space of the virtual device is as large as the capacity of the virtual device and may be set differently for each virtual device.

For example, the memory controller 210 may divide the storage region into storage regions the number of which is indicated by the device virtualization command, and may generate different pieces of ID data for the storage regions. In another example, the memory controller 210 may divide the storage region into storage regions the number of which is set by default, and may generate different pieces of ID data for the storage regions.

For example, read/write access authority may be set with respect to a virtual block assigned to a virtual device by the memory controller 210. A virtual block permitting only a read operation may be set as a copy-on-write block. A virtual block permitting only a write operation may also be set by the memory controller 210. For example, the read/write access authority set with respect to the virtual block assigned to the virtual device may be included in storage area data.

Next, in operation S130, the memory controller 210 stores information about the storage regions and the plurality of pieces of ID data in the memory device 220B.

FIG. 14 is a flowchart illustrating a method of processing a device recognition command in the storage device 200B according to an embodiment of the inventive concept.

In operation S210, the memory controller 210 of the storage device 200B determines whether the ID command ID CMD is received. For example, the ID command ID CMD may be received from the host 100A of FIG. 1 or the host 100B of FIG. 2.

In operation S220, when the ID command ID CMD is received, the memory controller 210 of the storage device 200B transmits to the host a plurality of pieces of ID data read from the memory device 220B. The plurality of pieces of ID data are the pieces of ID data for the virtual devices that are derived from one physical storage device via the device virtualization of FIG. 13.

Figure 15:
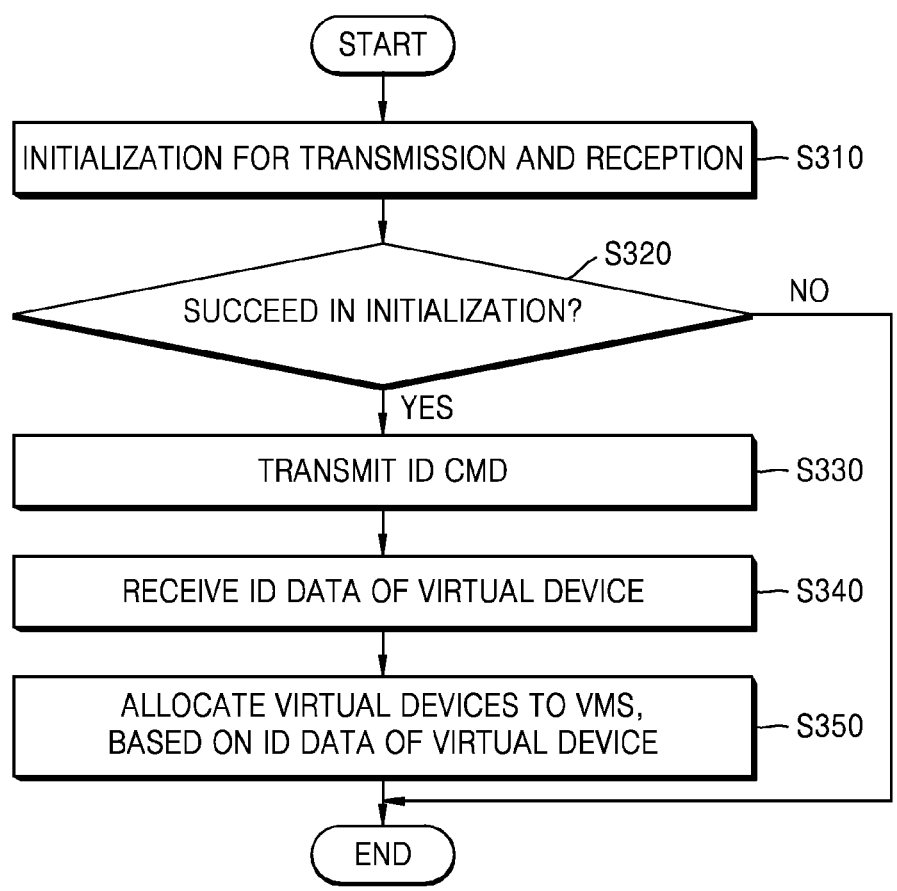
FIG. 15 is a flowchart illustrating an initialization and a device-recognition method in a storage virtualization system according to an exemplary embodiment of the inventive concept.

FIG. 15 is a flowchart illustrating an initialization and a device-recognition method in a storage virtualization system according to an exemplary embodiment of the inventive concept.

For example, the initialization and device-recognition method of FIG. 15 may be performed in the host 100A or 100B of the computing system 1000A or 1000B of FIG. 1 or 2.

First, in operation S310, a host, for example, the host 100A or 100B, performs an initialization operation for transmission and reception with the storage device 200 connected to the host. For example, when the storage device 200 is connected to the host 100A or 100B, the host which the storage device 200 is connected to may perform the initialization operation for transmission and reception by using an OOB sequence based on the SATA standard. In detail, the initialization operation for transmission and reception may be performed based on operations S1 through S6 of FIG. 12.

In operation S320, the host 100A or 100B determines whether the initialization operation for transmission and reception has been successfully completed. For example, the host 100A or 100B determines whether operations S1 through S6 of FIG. 12 have been successfully completed.

In operation S330, when the host 100A or 100B has determined that the initialization operation for transmission and reception has been successfully completed, the host 100A or 100B transmits the ID command ID CMD to the storage device 200.

In operation S340, the host 100A or 100B receives a plurality of pieces of ID data, from the storage device 200 for which the plurality of pieces of ID data are set via device virtualization, based on the ID command ID CMD.

In operation S350, the host 100A or 100B allocates virtual devices to VMs, based on the received plurality of pieces of ID data.

Figure 16:
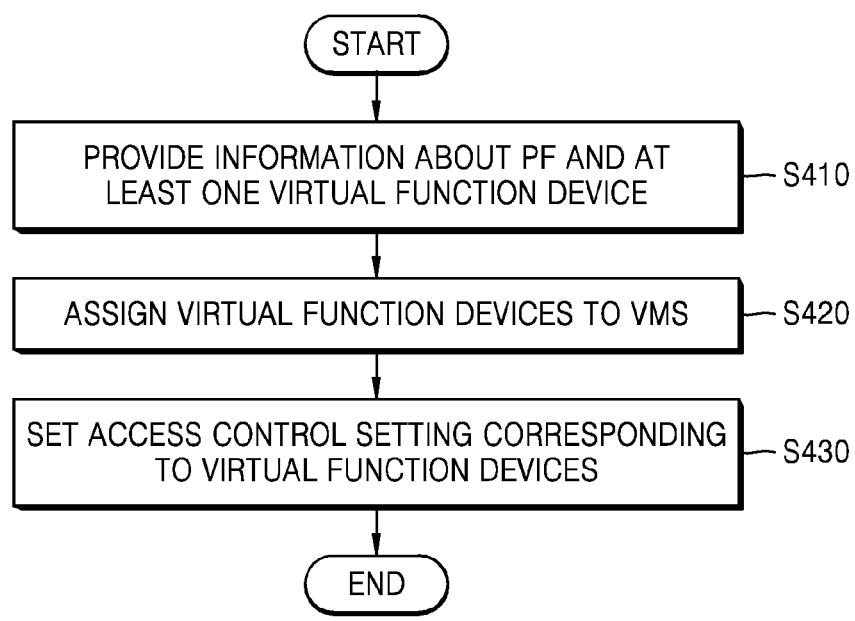
FIG. 16 is a flowchart illustrating a virtualization method in a storage virtualization system according to another exemplary embodiment of the inventive concept.

FIG. 16 is a flowchart illustrating a virtualization method in a storage virtualization system according to another exemplary embodiment of the inventive concept.

For example, the virtualization method of FIG. 16 may be performed in the storage virtualization system 2000A of FIG. 3 or the storage virtualization system 2000B of FIG. 4.

First, in operation S410, the storage device 200A generates the PF and at least one virtual device in response to a virtualization request received from the VMM 300 or the CVM 400 and provides information about the PF and at least one virtual device to the VMM 300 or CVM 400.

In operation S420, the VMM 300 or CVM 400 assigns the virtual function devices VF1 and VFj to the virtual machines VMs based on the information about the virtual function devices VF1 and VFj received from the storage device 200A.

In operation S430, the VMM 300 or CVM 400 controls access setting corresponding to the at least one virtual device. For example, the VMM 300 or CVM 400 may set resource mapping and access authority corresponding to the virtual function device through an interface provided to the storage device 200A.

Figure 17:
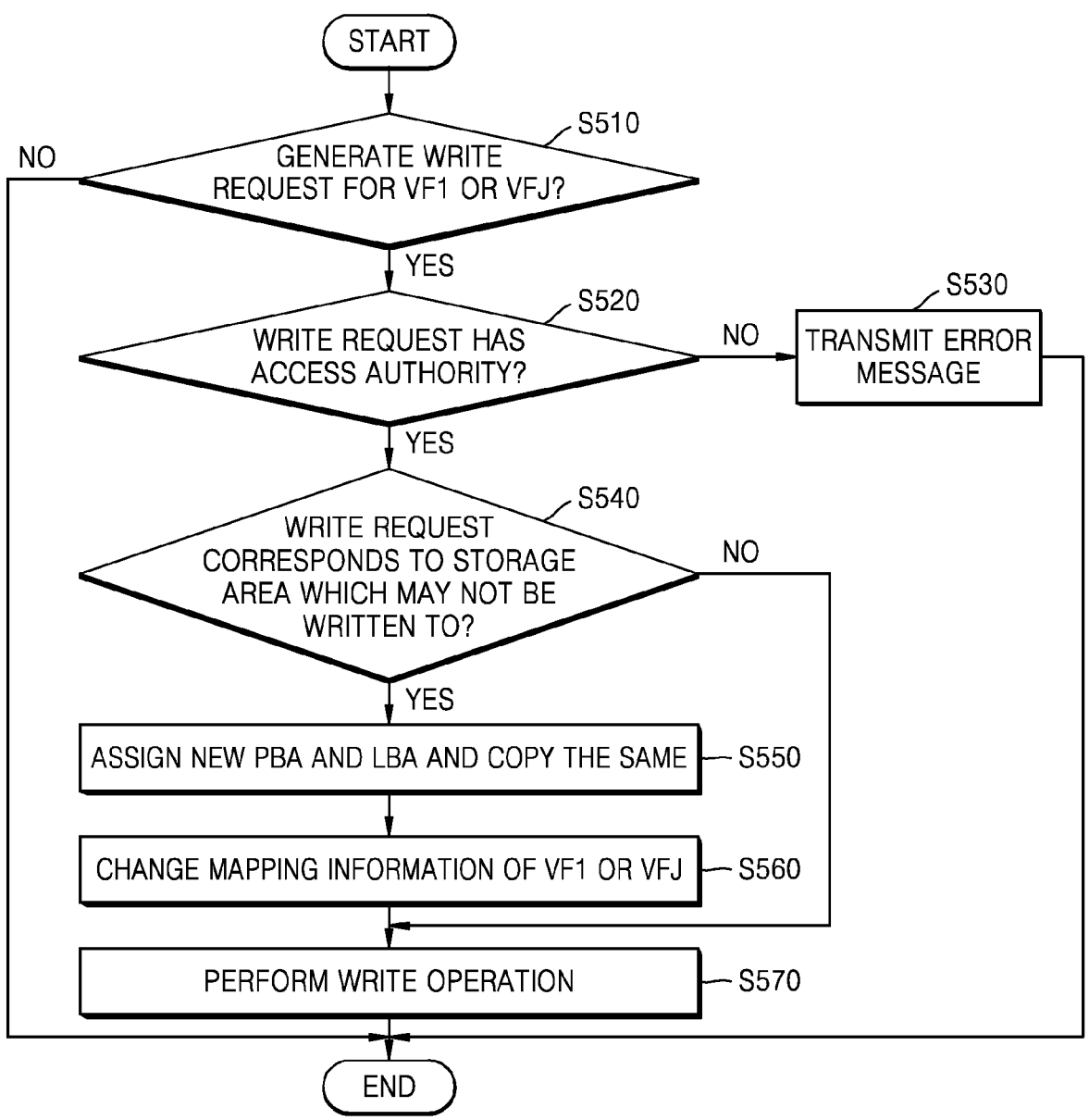
FIG. 17 is a flowchart illustrating an access control method in a storage virtualization system according to an exemplary embodiment of the inventive concept.

FIG. 17 is a flowchart illustrating an access control method in a storage virtualization system according to an exemplary embodiment of the inventive concept.

For example, the access control method of FIG. 17 may be performed in the virtual function device VF1 or VFj of the storage virtualization system 2000A of FIG. 3 or the storage virtualization system 2000B of FIG. 4.

In operation S510, the virtual function device VF1 or VFj determines whether a write request is received from a VM.

In operation S520, when the write request is received from the VM, the virtual function device VF1 or VFj determines whether the VM generating the write request has access authority. For example, the virtual function device VF1 or VFj determines whether identification information of the VM generating the write request matches identification information of a VM assigned to the virtual function device VF1 or VFj.

In operation S530, when the virtual function device VF1 or VFj determines in the operation S520 that the received write request is from a VM having no access authority, the virtual function device VF1 or VFj transmits an error message to the VM.

In operation S540, when the virtual function device VF1 or VFj determines in the operation S520 that the received write request is from a VM having access authority, the virtual function device VF1 or VFj determines whether the write request corresponds to a storage area which may not be written to. For example, the virtual function device VF1 or VFj determines whether the write request for writing to an LBA for which access authority is set as "read-only (RO)".

In operation S550, when the virtual function device VF1 or VFj determines in the operation S540 that the write request corresponds to a storage area which may not be written to, the virtual function device VF1 or VFj assigns a new PBA and LBA and copies the same. That is, the virtual function device VF1 or VFj copies data stored in the PBA corresponding to the LBA which received a write request to a newly assigned PBA.

In operation S560, mapping information of the virtual function device VF1 or VFj according to the copy operation is changed. That is, as described in FIG. 6, mapping information of the virtual function device assigned before the copy operation is changed to the newly assigned PBA and LBA, according to the copy operation.

In operation S570, after completing the copy-on-write operation, the virtual function device VF1 or VFj performs a write operation in response to a write request from the newly assigned PBA and LBA. Therefore, data may be copied to a storage area included among the updated list of storage areas shared by VMs. Therefore, it is possible to improve performance and extend the life of the storage virtualization system by reducing unnecessary writing/copying of data in the storage virtualization system.

Figure 18:
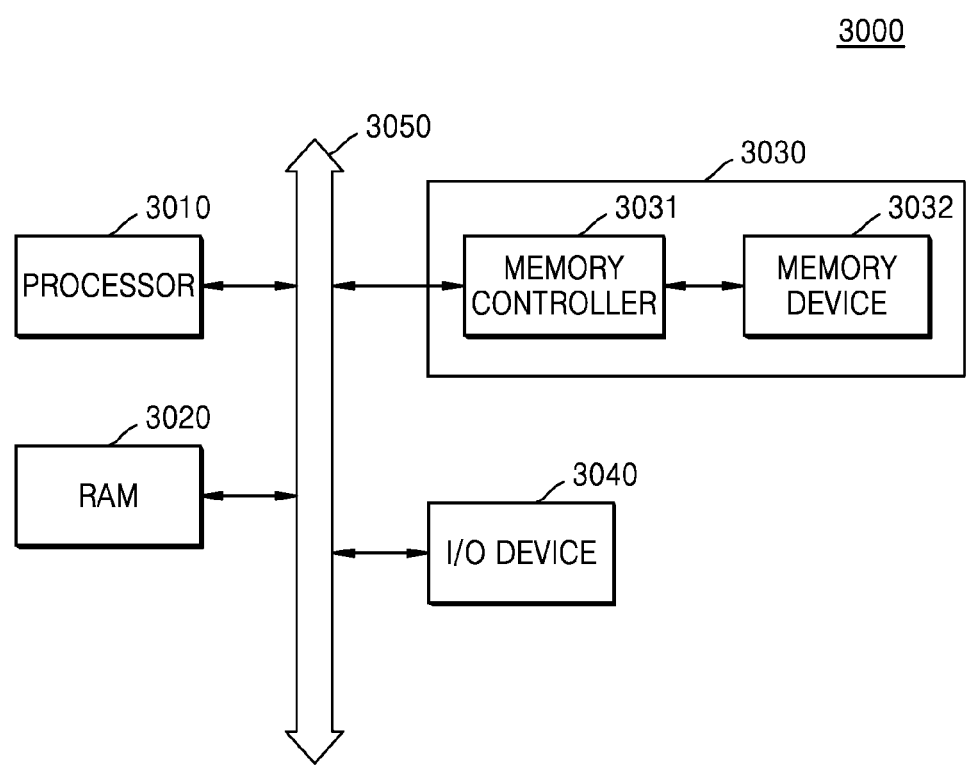
FIG. 18 is a block diagram illustrating an electronic device to which a storage device is applied according to an exemplary embodiment of the inventive concept.

FIG. 18 is a block diagram illustrating an electronic device 3000 to which a storage device is applied according to an exemplary embodiment of the inventive concept.

Referring to FIG. 18, the electronic device 3000 includes a processor 3010, a RAM 3020, a storage device 3030, an input/output (I/O) device 3040, and a bus 3050.

Although not shown in FIG. 18, the electronic device 3000 may further include ports which are capable of communicating with a video card, a sound card, a memory card, a USB device or other electronic devices. The electronic device 3000 may be implemented by using a personal computer, a laptop computer, a mobile device, a personal digital assistant (PDA), a digital camera, or the like.

The bus 3050 refers to a transmission channel via which data, a command signal, an address signal, and control signals are transmitted between components of the electronic device 3000 other than the bus 3050.

The processor 3010 may execute specific calculations or specific tasks. For example, the processor 3010 may be a micro-processor or a central processing unit (CPU). The processor 3010 may communicate with the RAM 3020, the storage device 3030, and the I/O device 3040 through the bus 3050, such as an address bus, a control bus, or a data bus. In some embodiments, the processor 3010 may be connected to an expansion bus such as a peripheral component interconnect (PCI) bus.

Pieces of data that are necessary for performing a process and generated by the processor 3010 are loaded into the RAM 3020. The RAM 3020 may operate as a main memory, and may be implemented by using a DRAM or SRAM.

The storage device 3030 includes a memory controller 3031 and a memory device 3032. The storage device 3030 may be the storage device 200B of FIG. 11. In other words, the memory controller 3031 and the memory device 3032 may be the memory controller 210 and the memory device 220B of FIG. 7, respectively.

The I/O device 3040 may include an input device, such as a keyboard, a keypad or a mouse, and an output device, such as a printer or a display.

The processor 3010 may perform a calculation or process data in accordance with a user command input via the I/O device 3040. To perform a calculation or process data in accordance with a user command, the processor 3010 may transmit to the storage device 3030 a request to read data from the storage device 3030 or write data to the storage device 3030.

The storage device 3030 may perform a read operation or a write operation according to the request received from the processor 3010.

While the inventive concept has been particularly shown and described with reference to exemplary embodiments thereof, it will be understood that various changes in form and details may be made therein without departing from the spirit and scope of the following claims.

What is claimed is:

1. A storage device comprising:
a non-volatile memory device; and
a memory controller configured to generate a physical function device and at least one virtual function device,
wherein the at least one virtual function device is assigned to a virtual machine of a host,
wherein the memory controller
converts a virtual address for the at least one virtual function device into a logical address in response to an access request,
performs an address conversion process converting the logical address into a physical address,
sets access authority corresponding to the at least one virtual function device, and
performs an access control operation, wherein the physical function device provides an interface for access authority setting with respect to the at least one virtual function device,
wherein the access control operation is based on the access authority of the virtual address region, the access authority of the logical address region, and a copy-on-write option, and
wherein when a write request is generated to the logical address region having read-only authority and the copy-on-write option, a new logical address region is assigned.

2. The storage device of claim 1, wherein the access authority includes one of read-only authority, read-write authority, and write-only authority for each of at least one physical storage area of the non-volatile memory device corresponding to each of the at least one virtual function device.

3. The storage device of claim 2, wherein the copy-on-write option corresponds to a virtual address region of the at least one virtual function device.

4. The storage device of claim 3, wherein the physical function device sets the copy-on-write option for a first physical storage area of the at least one physical storage area which corresponds to the virtual address region of the at least one virtual function device,
wherein the at least one virtual function device has the read-only authority for the first physical storage area.

5. The storage device of claim 4, wherein, when a write request is generated for writing data to a first virtual address in the virtual address region of the at least one virtual function device, the at least one virtual function device
assigns a second physical storage area of the at least one physical storage area and a second logical address for the second physical storage area, and
creates mapping information which maps the first virtual address to the second logical address, and maps the second logical address to a second physical address of the second physical storage area, and
wherein the virtual function device has read-write authority or write-only authority for the second physical storage area.

6. The storage device of claim 5, wherein the at least one virtual function device copies data stored in the first physical storage area corresponding to the first virtual address to the second physical storage area.

7. The storage device of claim 1, wherein the memory controller further comprises a random access memory that stores virtual function device mapping table information for retrieving the logical address corresponding to the virtual address, and each of the at least one virtual function device converts the virtual address into the logical address by using the virtual function device mapping table information stored in the random access memory.

8. The storage device of claim 7, wherein the memory controller writes the virtual function device mapping table information stored in the random access memory to the non-volatile memory device before the storage device is powered off, and loads the virtual function device mapping table information read from the non-volatile memory device to the random access memory after the storage device is powered on.

9. The storage device of claim 7, wherein the virtual function device mapping table information is transmitted to a virtual machine (VM) monitor of the host.

10. The storage device of claim 1, wherein the memory controller generates specific identification device (ID) data corresponding to the at least one virtual function device in response to a device virtualization request from the host, and transmits the generated specific ID data corresponding to the at least one virtual function device to the host.

11. A storage device comprising:
a non-volatile memory device;
an input/output (I/O) adapter; and
a memory controller configured to
communicate with a host connected through the input/output (I/O) adapter to transmit and receive data,
provide the host with a physical function device and at least one virtual function device,
convert a virtual address into a logical address,
perform an address conversion process converting the logical address into a physical address, and
perform an access control operation,
wherein the at least one virtual function device is assigned to a virtual machine of the host, and
wherein the physical function device provides an interface for access authority setting with respect to the at least one virtual function device,
wherein the access control operation is based on the access authority of the virtual address region, the access authority of the logical address region, and a copy-on-write option, and
wherein when a write request is generated to the logical address region having read-only authority and the copy-on-write option, a new logical address region is assigned.

12. The storage device of claim 11, wherein the access authority includes one of read-only authority, read-write authority, and write-only authority for each of at least one physical storage area of the non-volatile memory device corresponding to each of the at least one virtual function device.

13. The storage device of claim 12, wherein the copy-on-write option which corresponds to a virtual address region of the at least one virtual function device.

14. The storage device of claim 13, wherein the physical function device sets the copy-on-write option for a first physical storage area of the at least one physical storage area which corresponds to the virtual address region of at least one virtual function device,
wherein the at least one virtual function device has the read-only authority for the first physical storage area.

15. The storage device of claim 14, wherein, when a write request is generated for writing data to first virtual address in the virtual address region of the at least one virtual function device, the at least one virtual function device
assigns a second physical storage area of the at least one physical storage area and a second logical address for the second physical storage area, and
creates mapping information which maps the first virtual address to the second logical address, and maps the second logical address to a second physical address of the second physical storage area, and
wherein the virtual function device has read-write authority or write-only authority for the second physical storage area.

16. The storage device of claim 15, wherein the at least one virtual function device copies data stored in the first physical storage area corresponding to the first virtual address to the second physical storage area.

17. The storage device of claim 11, wherein the memory controller further comprises a random access memory that stores virtual function device mapping table information for retrieving the logical address corresponding to the virtual address, and each of the at least one virtual function device converts the virtual address into the logical address by using the virtual function device mapping table information stored in the random access memory.

18. The storage device of claim 17, wherein the memory controller writes the virtual function device mapping table information stored in the random access memory to the non-volatile memory device before the storage device is powered off, and loads the virtual function device mapping table information read from the non-volatile memory device to the random access memory after the storage device is powered on.

19. The storage device of claim 17, wherein the virtual function device mapping table information is transmitted to a virtual machine (VM) monitor of the host.

20. The storage device of claim 11, wherein the memory controller generates specific identification device (ID) data corresponding to the at least one virtual function device in response to a device virtualization request from the host, and transmits the generated specific ID data corresponding to the at least one virtual function device to the host.

* * * * *